United States Patent
Bai et al.

(10) Patent No.: US 12,531,715 B2
(45) Date of Patent: Jan. 20, 2026

(54) FLOW CONTROL FEEDBACK FOR FULL-DUPLEX COMMUNICATIONS

(71) Applicant: QUALCOMM Incorporated, San Diego, CA (US)

(72) Inventors: Tianyang Bai, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/492,409

(22) Filed: Oct. 1, 2021

(65) Prior Publication Data

US 2022/0109553 A1    Apr. 7, 2022

Related U.S. Application Data

(60) Provisional application No. 63/087,846, filed on Oct. 5, 2020.

(51) Int. Cl.
*H04B 17/318* (2015.01)
*H04B 17/336* (2015.01)
(Continued)

(52) U.S. Cl.
CPC ......... *H04L 5/1461* (2013.01); *H04B 17/318* (2015.01); *H04B 17/336* (2015.01); *H04L 5/0053* (2013.01)

(58) Field of Classification Search
CPC .... H04B 7/088; H04B 17/318; H04B 17/345; H04L 1/1819; H04L 5/0048; H04L 5/0053; H04L 5/1461; H04L 5/14
(Continued)

(56) References Cited

U.S. PATENT DOCUMENTS

| 5,218,680 A | 6/1993 | Farrell et al. |
|---|---|---|
| 8,160,101 B2 | 4/2012 | Kwak et al. |

(Continued)

FOREIGN PATENT DOCUMENTS

| CN | 109314983 A | 2/2019 |
|---|---|---|
| EP | 3637836 A1 | 4/2020 |

(Continued)

OTHER PUBLICATIONS

CATT: "TDD Inter-Band Carrier Aggregation", 3GPP Draft, R1-121081, 3GPP TSG RAN WG1 Meeting #68bis, 3rd Generation Partnership Project (3GPP), Mobile Competence Centre, 650, Route Des Lucioles, F-06921 Sophia-Antipolis Cedex, France, vol. RAN WG1, No. Jeju, Korea, Mar. 26, 2012-Mar. 30, 2012, Mar. 20, 2012 (Mar. 20, 2012), XP050599384, 5 Pages, [retrieved on Mar. 20, 2012] Section 2.2.

(Continued)

*Primary Examiner* — Harun Chowdhury
(74) *Attorney, Agent, or Firm* — Holland & Hart LLP / QUALCOMM Incorporated

(57) ABSTRACT

Methods, systems, and devices for wireless communication are described. The described techniques provide for improving negative acknowledgment (NACK) feedback from a user equipment (UE) to limit self-interference during full-duplex communications with a base station. After failing to receive a downlink transmission from a base station, a UE may generate feedback associated with self-interference at the UE to transmit to the base station. The UE may then transmit a report to the base station indicating that the UE failed to successfully decode the downlink transmission, and the UE may include the feedback associated with self-interference at the UE in the report. The base station may receive the report and adapt configurations used for full-duplex communications with the UE based on the feedback (Continued)

to limit self-interference at the UE during full-duplex communications.

26 Claims, 15 Drawing Sheets

(51) Int. Cl.
*H04L 5/00* (2006.01)
*H04L 5/14* (2006.01)

(58) Field of Classification Search
USPC .................................. 370/252, 277, 278, 329
See application file for complete search history.

(56) References Cited

U.S. PATENT DOCUMENTS

| | | | |
|---|---|---|---|
| 9,572,063 B2 | 2/2017 | Etemad et al. | |
| 9,641,309 B2 | 5/2017 | Ko et al. | |
| 11,271,625 B2 | 3/2022 | Park et al. | |
| 11,588,585 B2 | 2/2023 | Shao et al. | |
| 11,736,986 B2 | 8/2023 | Kung et al. | |
| 2009/0249153 A1 | 10/2009 | Zhang | |
| 2011/0292843 A1 | 12/2011 | Gan et al. | |
| 2013/0223294 A1 | 8/2013 | Karjalainen et al. | |
| 2015/0304883 A1 | 10/2015 | Tabet et al. | |
| 2016/0105878 A1 | 4/2016 | Zhao et al. | |
| 2016/0219583 A1 | 7/2016 | Blankenship | |
| 2016/0242176 A1 | 8/2016 | Sun et al. | |
| 2017/0026942 A1 | 1/2017 | Vajapeyam et al. | |
| 2017/0054544 A1* | 2/2017 | Kazmi | H04L 5/14 |
| 2017/0289733 A1 | 10/2017 | Rajagopal et al. | |
| 2017/0295594 A1 | 10/2017 | Ozturk et al. | |
| 2018/0007667 A1 | 1/2018 | You et al. | |
| 2018/0098349 A1 | 4/2018 | Sun et al. | |
| 2018/0123710 A1* | 5/2018 | Kim | H04B 17/345 |
| 2018/0160445 A1 | 6/2018 | Babaei et al. | |
| 2018/0352582 A1 | 12/2018 | Yi et al. | |
| 2019/0075585 A1 | 3/2019 | Deogun et al. | |
| 2019/0104539 A1 | 4/2019 | Park et al. | |
| 2019/0132838 A1 | 5/2019 | Yi et al. | |
| 2019/0150032 A1 | 5/2019 | Takeda et al. | |
| 2019/0335471 A1* | 10/2019 | Kim | H04L 5/0053 |
| 2019/0357149 A1 | 11/2019 | Zhang | |
| 2019/0373588 A1 | 12/2019 | Bae et al. | |
| 2020/0145998 A1 | 5/2020 | Sun et al. | |
| 2020/0154440 A1 | 5/2020 | Gholmieh et al. | |
| 2020/0220585 A1 | 7/2020 | John Wilson et al. | |
| 2020/0235980 A1 | 7/2020 | John Wilson et al. | |
| 2020/0245335 A1 | 7/2020 | Joseph et al. | |
| 2020/0296701 A1 | 9/2020 | Park et al. | |
| 2020/0313837 A1 | 10/2020 | Vejlgaard et al. | |
| 2020/0404684 A1 | 12/2020 | Lee et al. | |
| 2021/0058967 A1 | 2/2021 | Oteri et al. | |
| 2021/0259000 A1 | 8/2021 | Khoshnevisan et al. | |
| 2021/0321413 A1 | 10/2021 | Shin et al. | |
| 2021/0344455 A1 | 11/2021 | Choi et al. | |
| 2021/0351881 A1 | 11/2021 | Park et al. | |
| 2021/0377926 A1 | 12/2021 | Li et al. | |
| 2022/0022195 A1 | 1/2022 | Bruun et al. | |
| 2022/0039115 A1 | 2/2022 | Sun et al. | |
| 2022/0069884 A1* | 3/2022 | Zhang | H04B 17/318 |
| 2022/0078728 A1 | 3/2022 | Yi et al. | |
| 2022/0094484 A1 | 3/2022 | Babaei | |
| 2022/0095083 A1 | 3/2022 | Yeo et al. | |
| 2022/0109550 A1 | 4/2022 | Bai et al. | |
| 2022/0109551 A1 | 4/2022 | Bai et al. | |
| 2022/0110117 A1 | 4/2022 | Bai et al. | |
| 2022/0110137 A1 | 4/2022 | Bai et al. | |
| 2022/0124741 A1 | 4/2022 | Elshafie et al. | |
| 2022/0182160 A1* | 6/2022 | Su | H04B 17/345 |
| 2023/0032475 A1 | 2/2023 | Bae et al. | |
| 2023/0098368 A1 | 3/2023 | Yu et al. | |
| 2023/0148282 A1 | 5/2023 | Marinier et al. | |

FOREIGN PATENT DOCUMENTS

| | | |
|---|---|---|
| WO | WO-2015096027 A1 | 7/2015 |
| WO | WO-2017029292 A1 | 2/2017 |
| WO | WO-2017172165 A1 | 10/2017 |
| WO | WO-2018058455 A1 | 4/2018 |
| WO | WO-2019032882 A1 | 2/2019 |
| WO | WO-2019071580 A1 | 4/2019 |
| WO | WO-2020197645 A1 | 10/2020 |

OTHER PUBLICATIONS

International Search Report and Written Opinion—PCT/US2021/053370—ISA/EPO—Jan. 26, 2022.
Qualcomm Incorporated: "Multi-TRP Enhancements", 3GPP Draft, 3GPP TSG-RAN WG1 Meeting #98, R1-1909272 Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765877, 32 Pages, Retrieved from the Internet: URL: http://www.3gpp.org/ftp/tsg_ran/WG1_RL1/TSGR1_98/Docs/R1-1909272.zip [retrieved on Aug. 17, 2019] PDCCH Related Enhancements, p. 1, Paragraph 3.2, Section 4.1.2, p. 21-p. 23, Figure 12.

* cited by examiner

FLOW CONTROL FEEDBACK FOR FULL-DUPLEX COMMUNICATIONS

CROSS REFERENCE

The present application for patent claims the benefit of U.S. Provisional Patent Application No. 63/087,846 by BAI et al., entitled "FLOW CONTROL FEEDBACK FOR FULL-DUPLEX COMMUNICATIONS," filed Oct. 5, 2020, assigned to the assignee hereof, and expressly incorporated by reference herein.

INTRODUCTION

The following relates to wireless communications in wireless communication systems, including managing wireless communications in half duplex and full duplex wireless communication systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a UE operating in a full-duplex mode is described. The method may include identifying that the UE failed to successfully decode a downlink transmission from a base station, generating feedback associated with self-interference at the UE based on the identifying and the UE operating in the full-duplex mode, generating a report indicating that the UE failed to successfully decode the downlink transmission, the report including the feedback associated with self-interference at the UE based on the UE operating in the full-duplex mode, and transmitting the report with the feedback associated with self-interference at the UE to the base station.

A method of wireless communication at a UE is described. The method may include generating feedback associated with self-interference at the UE based on the UE failing to successfully decode a downlink transmission when in the full-duplex mode, generating a report, the report including the feedback associated with the self-interference at the UE based on the full-duplex mode, and transmitting the report with the feedback associated with the self-interference at the UE.

An apparatus for wireless communication in a full-duplex mode is described. The apparatus may include a processor, and memory coupled to the processor. The processor and memory may be configured to generate feedback associated with self-interference at the apparatus based on the failing to successfully decode a downlink transmission when in the full-duplex mode, generate a report, the report including the feedback associated with the self-interference at the apparatus based on the full-duplex mode, and transmit the report with the feedback associated with the self-interference at the apparatus.

Another apparatus for wireless communication in a full-duplex mode is described. The apparatus may include means for generating feedback associated with self-interference at the apparatus based on the apparatus failing to successfully decode a downlink transmission when in the full-duplex mode, generating a report, the report including the feedback associated with the self-interference at the apparatus based on the full-duplex mode, and transmitting the report with the feedback associated with the self-interference at the apparatus.

A non-transitory computer-readable medium storing code for wireless communication at a UE is described. The code may include instructions executable by a processor to generate feedback associated with self-interference at the UE based on the UE failing to successfully decode a downlink transmission when in the full-duplex mode, generate a report, the report including the feedback associated with the self-interference at the UE based on the full-duplex mode, and transmit the report with the feedback associated with the self-interference at the UE.

In some examples of the method, apparatuses, and non-transitory computer-readable medium described herein, the report may indicate that the UE failed to successfully decode the downlink transmission.

In some examples of the method, apparatuses, and non-transitory computer-readable medium described herein, generating feedback associated with the self-interference at the UE may include operations, features, means, or instructions for generating the feedback including a measurement of the self-interference at the UE, a ratio of the self-interference at the UE to a downlink signal strength of the downlink transmission, or both.

Some examples of the method, apparatuses, and non-transitory computer-readable medium described herein may further include operations, features, means, or instructions for determining that the UE failed to successfully decode the downlink transmission based on the self-interference caused by an uplink transmission from the UE, where generating the feedback associated with self-interference at the UE may include operations, features, means, or instructions for generating the feedback including an uplink power configuration at the UE used for transmitting the uplink transmission, an indication that the UE failed to successfully decode the downlink transmission based at least in part on the self-interference, or both.

In some examples of the method, apparatuses, and non-transitory computer-readable medium described herein, generating the feedback associated with the self-interference at the UE may include operations, features, means, or instructions for generating the feedback including a recommended beam pair for full-duplex communications with the base station, a recommended uplink power configuration for the full-duplex communications with the base station, or both.

Some examples of the method, apparatuses, and non-transitory computer-readable medium described herein may further include operations, features, means, or instructions for transmitting a semi-persistent scheduling uplink transmission that overlaps in a time domain with the downlink transmission, where generating the feedback associated with the self-interference at the UE may include operations, features, means, or instructions for generating the feedback including an indication that the UE transmitted the semi-persistent scheduling uplink transmission that overlaps in the time domain with the downlink transmission.

Some examples of the method, apparatuses, and non-transitory computer-readable medium described herein may further include operations, features, means, or instructions for receiving a configuration for full-duplex communications between the UE and the base station based on transmitting the report with the feedback associated with the self-interference at the UE.

Some examples of the method, apparatuses, and non-transitory computer-readable medium described herein may further include operations, features, means, or instructions for receiving radio resource control (RRC) signaling indicating that the UE may include the feedback associated with the self-interference at the UE in the report when the UE may be operating in the full-duplex mode.

A method of wireless communication at a base station is described. The method may include transmitting a downlink transmission to a UE, receiving, from the UE, a report including feedback associated with self-interference at the UE based on the UE operating in a full-duplex mode, and transmitting, to the UE, a configuration for full-duplex communications between the UE and the base station based on the report including the feedback associated with the self-interference.

An apparatus for wireless communication is described. The apparatus may include a processor, and memory coupled to the processor. The processor and memory may be configured to transmit a downlink transmission to a UE, receive, from the UE, a report including feedback associated with self-interference at the UE based on the UE operating in a full-duplex mode, and transmitting, to the UE, a configuration for full-duplex communications between the UE and the apparatus based on the report including the feedback associated with the self-interference.

Another apparatus for wireless communication is described. The apparatus may include means for transmitting a downlink transmission to a UE, receiving, from the UE, a report including feedback associated with self-interference at the UE based on the UE operating in a full-duplex mode, and transmitting, to the UE, a configuration for full-duplex communications between the UE and the apparatus based on the report including the feedback associated with the self-interference.

A non-transitory computer-readable medium storing code for wireless communication at a base station is described. The code may include instructions executable by a processor to transmit a downlink transmission to a UE, receive, from the UE, a report including feedback associated with self-interference at the UE based on the UE operating in a full-duplex mode, and transmitting, to the UE, a configuration for full-duplex communications between the UE and the base station based on the report including the feedback associated with the self-interference.

In some examples of the method, apparatuses, and non-transitory computer-readable medium described herein, the report may indicate that the UE failed to successfully decode the downlink transmission.

In some examples of the method, apparatuses, and non-transitory computer-readable medium described herein, the feedback associated with the self-interference at the UE includes a measurement of the self-interference at the UE, a ratio of the self-interference at the UE to a downlink signal strength of the downlink transmission, or both. In such examples, transmitting the configuration for the full-duplex communications to the UE may include operations, features, means, or instructions for transmitting the configuration for the full-duplex communications to the UE based on the measurement of the self-interference at the UE, the ratio of the self-interference at the UE to downlink signal strength, or both.

In some examples of the method, apparatuses, and non-transitory computer-readable medium described herein, the feedback associated with the self-interference at the UE may include an uplink power configuration, at the UE, used for transmitting an uplink transmission causing the self-interference on the downlink transmission, an indication that the UE failed to successfully decode the downlink transmission based on the self-interference, or both. In such examples, transmitting the configuration for the full-duplex communications to the UE may include operations, features, means, or instructions for transmitting the configuration for the full-duplex communications to the UE based on the uplink power configuration, the indication that the UE failed to successfully decode the downlink transmission based on the self-interference, or both.

In some examples of the method, apparatuses, and non-transitory computer-readable medium described herein, the feedback associated with the self-interference at the UE includes a recommended beam pair for the full-duplex communications, a recommended uplink power configuration for the full-duplex communications, or both. In such examples, transmitting the configuration for the full-duplex communications to the UE may include operations, features, means, or instructions for transmitting the configuration for the full-duplex communications to the UE based on the recommended beam pair for the full-duplex communications, the recommended uplink power configuration for the full-duplex communications, or both.

In some examples of the method, apparatuses, and non-transitory computer-readable medium described herein, the feedback associated with the self-interference at the UE includes an indication that the UE transmitted a semi-persistent scheduling uplink transmission that overlaps in a time domain with the downlink transmission. In such examples, transmitting the configuration for the full-duplex communications to the UE may include operations, features, means, or instructions for transmitting the configuration for the full-duplex communications to the UE based on the indication that the UE transmitted the semi-persistent scheduling uplink transmission that overlaps in the time domain with the downlink transmission.

Some examples of the method, apparatuses, and non-transitory computer-readable medium described herein may further include operations, features, means, or instructions for transmitting RRC signaling indicating that the UE may include the feedback associated with the self-interference at the UE in the report when the UE may be operating in the full-duplex mode. An apparatus for wireless communication at a UE operating in a full-duplex mode is described. The apparatus may include a processor, memory coupled with the processor, and instructions stored in the memory. The instructions may be executable by the processor to cause the apparatus to identify that the UE failed to successfully decode a downlink transmission from a base station, generate feedback associated with self-interference at the UE based on the identifying and the UE operating in the full-duplex mode, generate a report indicating that the UE failed to successfully decode the downlink transmission, the report including the feedback associated with self-interference at the UE based on the UE operating in the full-duplex mode, and transmit the report with the feedback associated with self-interference at the UE to the base station.

Another apparatus for wireless communication at a UE operating in a full-duplex mode is described. The apparatus may include means for identifying that the UE failed to successfully decode a downlink transmission from a base station, generating feedback associated with self-interference at the UE based on the identifying and the UE operating in the full-duplex mode, generating a report indicating that the UE failed to successfully decode the downlink transmission, the report including the feedback associated with self-interference at the UE based on the UE operating in the full-duplex mode, and transmitting the report with the feedback associated with self-interference at the UE to the base station.

A non-transitory computer-readable medium storing code for wireless communication at a UE operating in a full-duplex mode is described. The code may include instructions executable by a processor to identify that the UE failed to successfully decode a downlink transmission from a base station, generate feedback associated with self-interference at the UE based on the identifying and the UE operating in the full-duplex mode, generate a report indicating that the UE failed to successfully decode the downlink transmission, the report including the feedback associated with self-interference at the UE based on the UE operating in the full-duplex mode, and transmit the report with the feedback associated with self-interference at the UE to the base station.

In some examples of the method, apparatuses, and non-transitory computer-readable medium described herein, generating feedback associated with self-interference at the UE may include operations, features, means, or instructions for generating feedback including a measurement of self-interference at the UE, a ratio of self-interference at the UE to downlink signal strength of the downlink transmission, or both.

Some examples of the method, apparatuses, and non-transitory computer-readable medium described herein may further include operations, features, means, or instructions for determining that the UE failed to successfully decode the downlink transmission based on self-interference caused by an uplink transmission from the UE, where generating feedback associated with self-interference at the UE may include operations, features, means, or instructions for generating feedback including an uplink power configuration at the UE used for transmitting the uplink transmission, an indication that the UE failed to successfully decode the downlink transmission based at least in part on the self-interference, or both.

In some examples of the method, apparatuses, and non-transitory computer-readable medium described herein, generating feedback associated with self-interference at the UE may include operations, features, means, or instructions for generating feedback including a recommended beam pair for full-duplex communications with the base station, a recommended uplink power configuration for full-duplex communications with the base station, or both.

Some examples of the method, apparatuses, and non-transitory computer-readable medium described herein may further include operations, features, means, or instructions for transmitting a semi-persistent scheduling uplink transmission that overlaps in a time domain with the downlink transmission, where generating feedback associated with self-interference at the UE may include operations, features, means, or instructions for generating feedback including an indication that the UE transmitted the semi-persistent scheduling uplink transmission that overlaps in the time domain with the downlink transmission.

Some examples of the method, apparatuses, and non-transitory computer-readable medium described herein may further include operations, features, means, or instructions for receiving a configuration for full-duplex communications between the UE and the base station based on transmitting the report with the feedback associated with self-interference at the UE to the base station.

In some examples of the method, apparatuses, and non-transitory computer-readable medium described herein, transmitting the report with the feedback associated with self-interference at the UE to the base station may include operations, features, means, or instructions for transmitting the report with the feedback associated with self-interference at the UE to the base station in a control channel, data channel, or both.

In some examples of the method, apparatuses, and non-transitory computer-readable medium described herein, transmitting the report in the control channel, data channel, or both may include operations, features, means, or instructions for transmitting a first stage of the report to the base station in the control channel, receiving a grant allocating resources in the data channel for the UE to transmit a second stage of the report, and transmitting the second stage of the report in the data channel based on receiving the grant, where the second stage of the report includes the feedback associated with self-interference at the UE.

Some examples of the method, apparatuses, and non-transitory computer-readable medium described herein may further include operations, features, means, or instructions for receiving RRC signaling indicating that the UE may be to include the feedback associated with self-interference at the UE in the report when the UE may be operating in the full-duplex mode.

A method of wireless communication at a base station is described. The method may include transmitting a downlink transmission to a UE, receiving a report from the UE indicating that the UE failed to successfully decode the downlink transmission, where the report includes feedback associated with self-interference at the UE based on the UE operating in a full-duplex mode, and transmitting, to the UE, a configuration for full-duplex communications between the UE and the base station based on receiving the report with the feedback associated with self-interference.

An apparatus for wireless communication at a base station is described. The apparatus may include a processor, memory coupled with the processor, and instructions stored in the memory. The instructions may be executable by the processor to cause the apparatus to transmit a downlink transmission to a UE, receive a report from the UE indicating that the UE failed to successfully decode the downlink transmission, where the report includes feedback associated with self-interference at the UE based on the UE operating in a full-duplex mode, and transmit, to the UE, a configuration for full-duplex communications between the UE and the base station based on receiving the report with the feedback associated with self-interference.

Another apparatus for wireless communication at a base station is described. The apparatus may include means for transmitting a downlink transmission to a UE, receiving a report from the UE indicating that the UE failed to successfully decode the downlink transmission, where the report includes feedback associated with self-interference at the UE based on the UE operating in a full-duplex mode, and transmitting, to the UE, a configuration for full-duplex communications between the UE and the base station based on receiving the report with the feedback associated with self-interference.

A non-transitory computer-readable medium storing code for wireless communication at a base station is described. The code may include instructions executable by a processor to transmit a downlink transmission to a UE, receive a report from the UE indicating that the UE failed to successfully decode the downlink transmission, where the report includes feedback associated with self-interference at the UE based on the UE operating in a full-duplex mode, and transmit, to the UE, a configuration for full-duplex communications between the UE and the base station based on receiving the report with the feedback associated with self-interference.

In some examples of the method, apparatuses, and non-transitory computer-readable medium described herein, the feedback associated with self-interference at the UE includes a measurement of self-interference at the UE, a ratio of self-interference at the UE to downlink signal strength of the downlink transmission, or both. In such examples, transmitting the configuration for the full-duplex communications to the UE may include operations, features, means, or instructions for transmitting the configuration for the full-duplex communications to the UE based at least in part on the measurement of self-interference at the UE, the ratio of self-interference at the UE to downlink signal strength, or both.

In some examples of the method, apparatuses, and non-transitory computer-readable medium described herein, the feedback associated with self-interference at the UE may include an uplink power configuration at the UE used for transmitting an uplink transmission causing self-interference on the downlink transmission, an indication that the UE failed to successfully decode the downlink transmission based on self-interference, or both. In such examples, transmitting the configuration for the full-duplex communications to the UE may include operations, features, means, or instructions for transmitting the configuration for the full-duplex communications to the UE based on the uplink power configuration, the indication that the UE failed to successfully decode the downlink transmission based on self-interference, or both.

In some examples of the method, apparatuses, and non-transitory computer-readable medium described herein, the feedback associated with self-interference at the UE includes a recommended beam pair for full-duplex communications, a recommended uplink power configuration for full-duplex communications, or both. In such examples, transmitting the configuration for the full-duplex communications to the UE may include operations, features, means, or instructions for transmitting the configuration for the full-duplex communications to the UE based on the recommended beam pair for full-duplex communications, the recommended uplink power configuration for full-duplex communications, or both.

In some examples of the method, apparatuses, and non-transitory computer-readable medium described herein, the feedback associated with self-interference at the UE includes an indication that the UE transmitted a semi-persistent scheduling uplink transmission that overlaps in a time domain with the downlink transmission. In such examples, transmitting the configuration for the full-duplex communications to the UE may include operations, features, means, or instructions for transmitting the configuration for the full-duplex communications to the UE based on the indication that the UE transmitted the semi-persistent scheduling uplink transmission that overlaps in the time domain with the downlink transmission.

In some examples of the method, apparatuses, and non-transitory computer-readable medium described herein, receiving the report with the feedback associated with self-interference at the UE may include operations, features, means, or instructions for receiving the report with the feedback associated with self-interference at the UE from the UE in a control channel, data channel, or both.

In some examples of the method, apparatuses, and non-transitory computer-readable medium described herein, receiving the report in the control channel, data channel, or both may include operations, features, means, or instructions for receiving a first stage of the report from the UE in the control channel, transmitting a grant allocating resources in the data channel for the UE to transmit a second stage of the report, and receiving the second stage of the report in the data channel based on transmitting the grant, where the second stage of the report includes the feedback associated with self-interference at the UE.

Some examples of the method, apparatuses, and non-transitory computer-readable medium described herein may further include operations, features, means, or instructions for transmitting RRC signaling indicating that the UE may be to include the feedback associated with self-interference at the UE in the report when the UE may be operating in the full-duplex mode.

DETAILED DESCRIPTION

Figure 1:
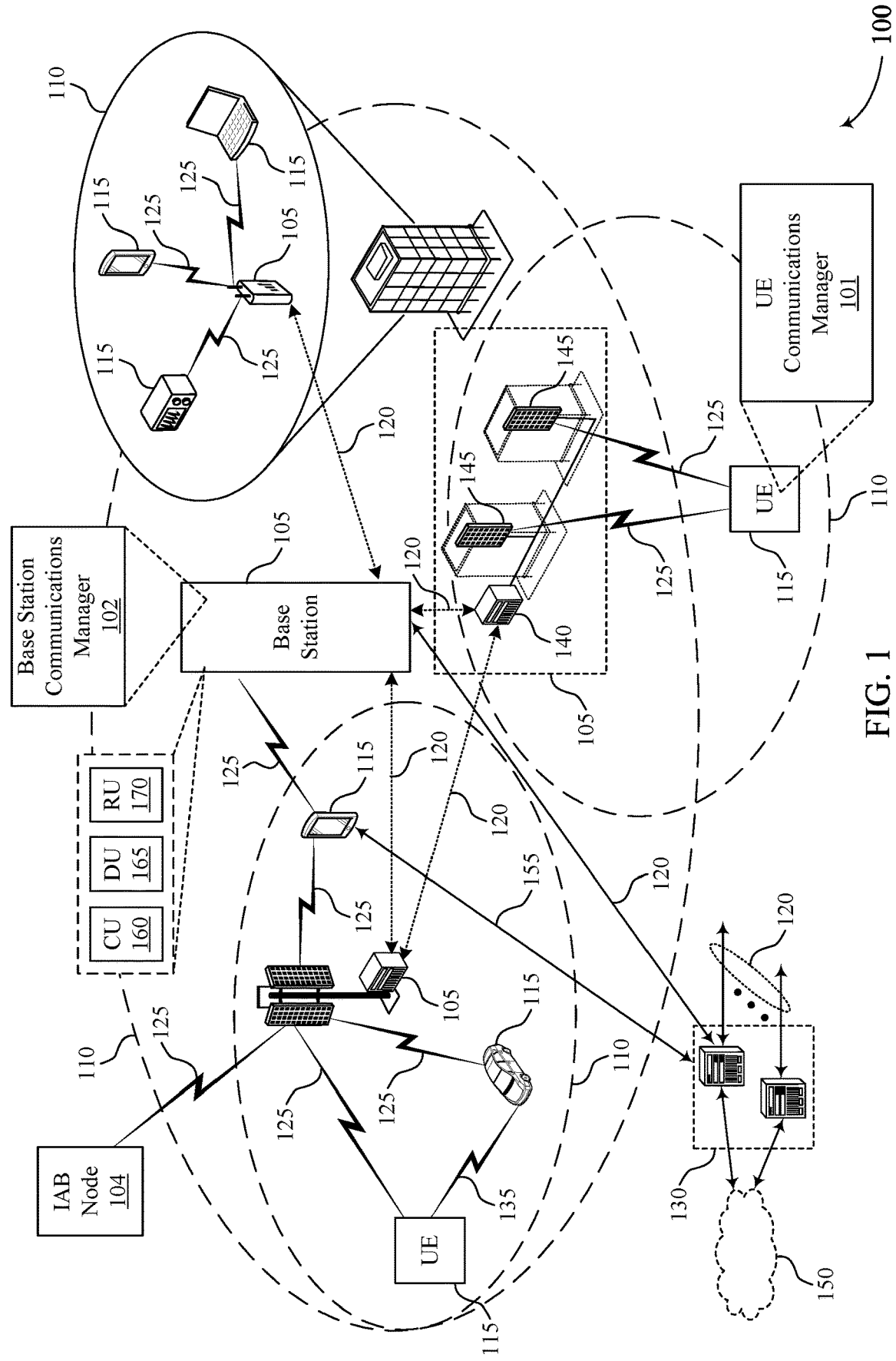
FIGS. 1 and 2 illustrate examples of wireless communications systems that support flow control feedback for full-duplex communications in accordance with one or more aspects of the present disclosure.

A wireless communications system may include a communication device, such as a UE or a base station (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. The communication device may operate in a half-duplex mode or a full-duplex mode, or a combination thereof. For example, in a half-duplex mode, a UE may either transmit uplink communications or receive downlink communications during a transmission time interval (TTI). In the full-duplex mode, the UE may simultaneously transmit uplink communications and receive downlink communications during the TTI. A TTI may span one or more time resources (e.g., symbols, mini-slots, slot, etc.). As described herein, simultaneous wireless communication by a base station or a UE, or both, may include uplink transmission, uplink reception, downlink transmission, or downlink reception, or a combination thereof, that occurs at the same time (e.g., a symbol period, a mini-slot, a slot, etc.). As described herein, the term "simultaneous wireless communication" may refer to wireless communications which overlap in the time-domain.

In some cases, when communicating in a full-duplex mode, a UE may experience self-interference. As used herein, the term "self-interference" may refer to interference caused by uplink transmissions from the UE on downlink transmissions to the UE or interference caused by downlink transmissions to the UE on uplink transmission from the UE (e.g., between transmitted and received signals). In such cases, if a base station transmits a downlink transmission to a UE, and the self-interference at the UE is above a threshold, the UE may fail to receive the downlink transmission. As such, the UE may transmit negative acknowledgment (NACK) feedback to the base station indicating that the UE failed to receive the downlink transmission. According to some examples, the base station may be unaware of self-interference at the UE and, as such, may determine that the UE failed to receive the downlink transmission based on channel conditions. Accordingly, to increase the likelihood of successful reception of subsequent transmission as the UE, the base station may perform rate adaptation and adjust the modulation and coding scheme (MCS). However, because the UE failed to receive the downlink transmission based on self-interference rather than channel conditions, the adjustments made by the base station may be unnecessary and unhelpful, and the UE may continue to fail to receive subsequent downlink transmissions due to self-interference. As used herein, the term "feedback" may include NACK feedback information, or additional information associated with self-interference.

As described herein, a UE and a base station may support techniques for utilizing NACK feedback to limit self-interference at the UE during full-duplex communications with the base station. As used herein, the term "full-duplex" may refer to a mode that supports two-way communication via simultaneous transmission and reception. After failing to receive a downlink transmission from a base station, a UE may generate feedback associated with self-interference at the UE to transmit to the base station. The UE may then transmit a report to the base station indicating that the UE failed to successfully decode the downlink transmission, and the UE may include the feedback associated with self-interference at the UE in the report. As used herein, the term "report" may refer to a feedback message including feedback information associated with self-interference. The base station may receive the report and adapt full-duplex communications with the UE based on the feedback associated with self-interference at the UE. For instance, the base station may change a configuration used for full-duplex communications with the UE based on the report to limit self-interference at the UE during full-duplex communications. As used herein, the term "configuration" may refer to an uplink transmit beam used by a UE to transmit uplink transmissions during full-duplex communications, a downlink receive beam used by the UE to receive downlink transmissions during full-duplex communications, or a modulation and coding scheme (MCS), a precoding matrix indicator (PMI), or a rank indication (RI) used for uplink or downlink transmissions during full-duplex communications.

A communication device (e.g., a base station or a UE) may be configured with multiple antennas, which may be used to transmit and receive communications while operating in a full-duplex mode. In some cases, the communication device may be configured with multiple antennas panels for uplink communications and downlink communications. In some cases, the communication device may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna.

Aspects of the subject matter described in the disclosure may be implemented to configuring the communication device to support techniques for providing feedback related to self-interference and may support improvements to power consumption, spectral efficiency, and, in some examples, and may promote higher reliability and lower latency duplex communications. In some examples, the techniques may be employed by the communication device for duplex communications.

Aspects of the disclosure introduced above are described below in the context of a wireless communications system. Examples of processes and signaling exchanges that support flow control feedback for full-duplex communications are then described. Aspects of the disclosure are further illustrated by and described with reference to apparatus diagrams, system diagrams, and flowcharts that relate to flow control feedback for full-duplex communications.

FIG. 1 illustrates an example of a wireless communications system 100 that supports flow control feedback for full-duplex communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station

105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM. In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

A UE 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some UEs 115 may support a full-duplex mode. A full-duplex mode may refer to a mode that supports two-way communication via simultaneous transmission and reception. The full-duplex mode is an emerging technique which is capable of theoretically doubling link capacity by enabling radio network nodes to transmit and receive simultaneously on the same frequency and time radio resource. Full-duplex breaks half-duplex operation constraints where transmission and reception either differ in time or in frequency. A full-duplex network node, such as a base station 105 or UE 115 in the cellular network, can communicate simultaneously in uplink and downlink with two half-duplex panels using the same radio resources. Thus, a UE 115 (e.g., a vehicle in V2X communications) equipped with multiple TRPs that owns the capability of simultaneous transmission and reception using the same time-frequency radio resource may be referred to as a full-duplex capable UE. The UE 115 may also be capable of working in both the full-duplex mode and backing off to a half-duplex mode.

In the wireless communications system 100, a UE 115 or a base station 105, or both, may support half duplex communications or full duplex communications, or a combination thereof. For example, a UE 115 may operate in a half-duplex mode, in which the UE 115 may either receive downlink communications from a base station 105, or transmit uplink communication to the base station 105, during a TTI. Similarly, a base station 105 may operate in a half-duplex mode, in which the base station 105 may either transmit downlink communications to a UE 115, or receive uplink communication from the UE 115, during a TTI. In some cases, a UE 115 or a base station 105, or both, may experience self-interference when operating in a full duplex mode. In some examples, the self-interference may occur due to signal leakage between a transmit antenna and a receive antenna. In some examples, the self-interference may occur from a transmit antenna to a receive chain due to a proxy of a UE 115 or a base station 105, or both. In some other examples, the self-interference may occur from a transmit antenna to a receive chain due to one or more signal reflections as a result of local antenna clutter. In some cases, a self-interference from a transmit signal may be as strong as a receive signal with cancellation techniques (e.g., analog cancellation operations, digital cancellation operations, etc.).

A UE 115 or a base station 105, or both, when operating in a full duplex mode may use different BWPs to reduce a self-interference. That is, a UE 115 or a base station 105, or both, may use different BWPs for downlink communications and uplink communications. For example, a UE 115 may use one BWP for receiving downlink transmissions from a base station 105, and another BWP for transmitting uplink transmissions to the base station 105. Similarly, a base station 105 may use one BWP for transmitting downlink transmissions to a UE 115, and another BWP for receiving uplink transmissions from the UE 115. In some cases, reducing or mitigating self-interference may improve spectrum efficiency in the wireless communications system 100. In some other cases, reducing or mitigating self-interference may provide a higher reliability and a lower latency for wireless communications between a UE 115 and a base station 105, or between at least two UEs 115 (e.g., in D2D wireless communications), etc.

The wireless communications system 100 may, additionally or alternatively, support decreasing or eliminating self-interference based on beam pair selection. A base station 105 or a UE 115, or both, may reduce or mitigate self-interference based on selection of an uplink and downlink beam pair. For example, a base station 105 or a UE 115, or both, may select a transmit beam (e.g., a transmit uplink beam, a transmit downlink beam) and a receive beam (e.g., a receive uplink beam, a receive downlink beam) from different antenna panels or beams with different spatial directions and orientations, or the like. In some examples, a base station 105 or a UE 115, or both, may select uplink and downlink beam pairs based on a beam training procedure using simultaneous reference signal sweeping operations (e.g., CSI-RS, SRS, etc.). In a full duplex mode, a base station 105 or a UE 115, or both, may use two beam pair links for uplink and downlink balancing a signal strength in an intended link (e.g., uplink and downlink path loss balancing) and self-interference. For example, if an uplink beam changes then the UE 115 may also update a downlink beam.

In the wireless communications system 100 a UE 115 and a base station 105 (e.g., an eNB, a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The base station 105 and the UE 115 may operate in a half-duplex mode or a full-duplex mode, or a combination thereof. The wireless communications system 100 may be configured to support techniques at a UE 115 for reporting feedback associated with self-interference to a base station 105 after failing to receive a downlink transmission from the base station 105. That is, the UE 115 may be configured to transmit additional feedback (e.g., in addition to an indication that the UE 115 failed to receive the downlink transmission) to assist the base station 105 in configuring the UE 115 appropriately for full-duplex communications. Because the additional feedback may be associated with self-interference (e.g., include self-interference measurements or may be otherwise based on self-interference), the additional feedback may be different from any feedback reported by a UE 115 operating in a half-duplex mode (e.g., since the UE 115 operating in the half-duplex mode may not experience self-interference).

A base station 105 may include a base station communications manager 102 that enables the base station 105 to receive a report from a UE 115 including feedback associated with self-interference at the UE 115 and configuring the UE 115 for full-duplex communications based on the feedback associated with self-interference. A UE 115 may include a UE communications manager 101 that enables the UE 115 to transmit a report to a base station including feedback associated with self-interference at the UE 115 and receiving a configuration from the base station for full-duplex communications based on the feedback associated with self-interference. Because the configuration at the UE 115 for receiving downlink transmissions may be adapted to limit self-interference, the chances that the UE 115 is able to successfully receive and decode subsequent downlink transmissions from the base station 105 may increase.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 MHz to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the ITU as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for flow control feedback for full-duplex communications as described herein. For example, some operations described as being performed by a UE 115 or a base station 105 may additionally or alternatively be performed by components of the disaggregated RAN architecture (e.g., IAB nodes, DUs, CUs, etc.).

The UEs 115 and the base stations 105 may support retransmissions of data to increase the likelihood that data is received successfully. Flow control feedback is one technique for increasing the likelihood that data is received correctly over a communication link 125. Flow control feedback may include an acknowledgment (ACK) indicating that a receiving device successfully decoded a transmission and a NACK indicating that a receiving device failed to decode a transmission. An example of flow control feedback (i.e., feedback controlling the flow of communications between a base station 105 and a UE 115) is hybrid automatic repeat request (HARQ) feedback. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, base stations 105 in wireless communications system 100 may support rate control and rate adaption to adjust a rate of transmission based on channel conditions. For example, a channel gain of a channel may change over time as a UE 115 moves and changes location (e.g., time varying fading). Thus, a base station 105 may adjust a rate of transmission (e.g., MCS) based on channel gain or channel conditions to improve throughput in wireless communications system 100. The base station 105 may perform rate control based on ACK/NACK feedback from a UE 115. For instance, the base station 105 may increase an MCS by one after receiving M consecutive ACKs, and the base station 105 may decrease an MCS by X after receiving one or more NACKs. Using these techniques, the base station 105 may be able handle downlink failures due to changes in channel conditions.

Additionally, as described above, one major reason for downlink failure in a full-duplex mode may be self-interference. For instance, an uplink transmission from a UE 115 may be too loud such that the uplink transmission creates a strong self-interference on a downlink transmission at the UE 115. Besides rate control (e.g., changing an MCS), there may be more efficient ways to handle downlink failures due to self-interference. In one example, a base station 105 may request that a UE 115 changes an uplink power. In another example, a base station 105 may request that a UE 115 changes from operating in a full-duplex mode to operating in a half-duplex mode. In yet another example, a base station 105 and a UE 115 may change to another uplink downlink beam pair for full-duplex communications to limit self-interference.

In some cases, however, a base station 105 may be unaware of whether a UE 115 is operating in a full-duplex mode and whether the UE 115 is experiencing self-interference. For instance, the UE 115 may perform the measurements of self-interference, and the base station 105 may be unaware of these measurements. Further, for a grant-free uplink transmission, the base station 105 may not accurately know if the uplink transmission was transmitted when the downlink failure happened. In particular, the grant-free uplink transmission, which may be referred to as a semi-static, semi-persistent, or semi-persistent scheduling (SPS) uplink transmission, may be a transmission on pre-allocated resources (e.g., resources allocated via RRC instead of via a grant), and the base station 105 may not be able to identify whether the pre-allocated resources include an uplink transmission. Because the base station 105 may be unaware of self-interference at the UE 115, the base station 105 may be unable to adapt full-duplex communications with the UE 115 based on the self-interference. As a result, the UE 115 may continue to experience downlink failure due to self-interference. A UE 115 in wireless communications system 100 may support efficient techniques for utilizing NACK feedback to provide feedback associated with self-interference at the UE 115 to a base station 105.

Figure 2:
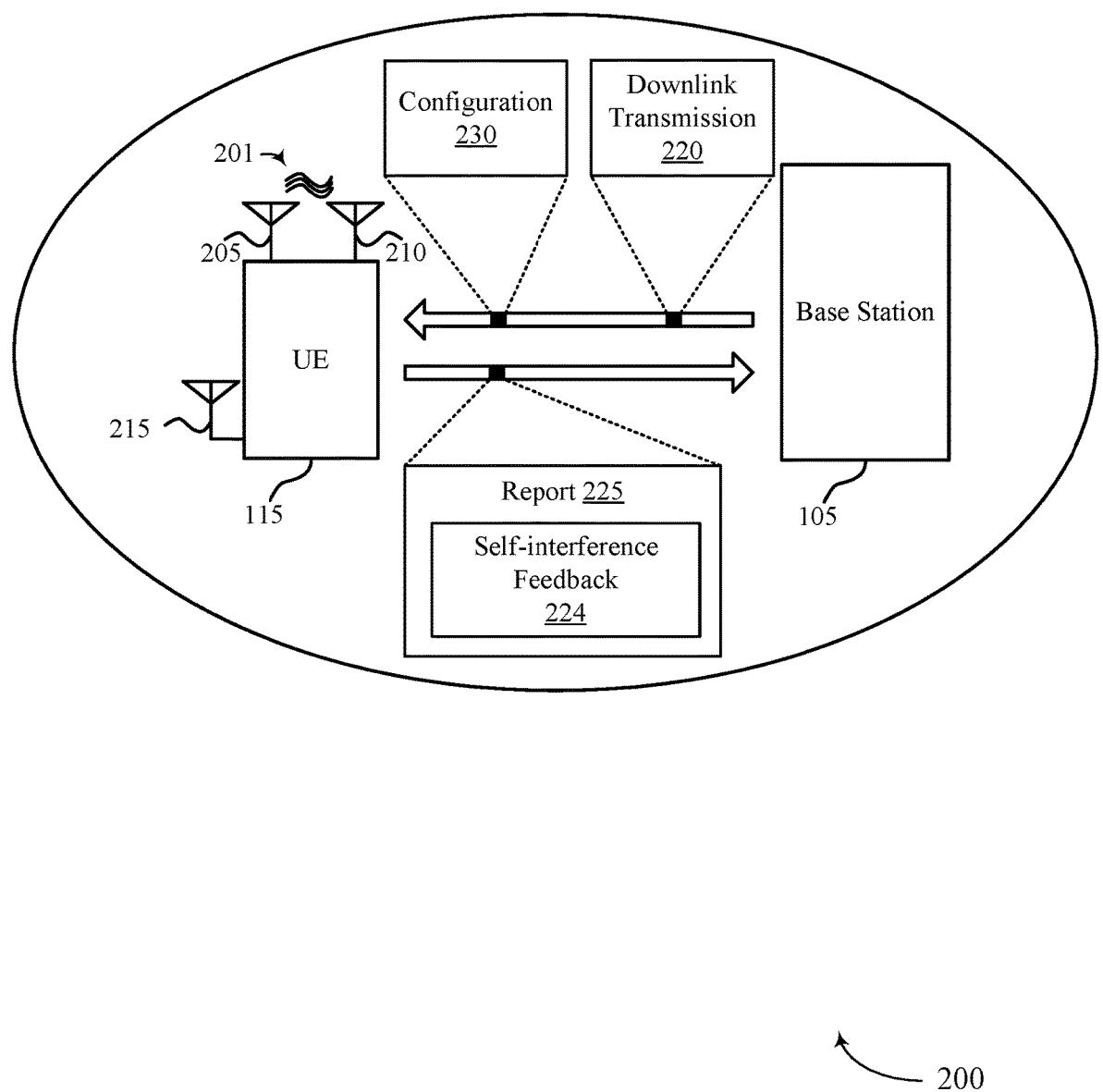

FIG. 2 illustrates an example of a wireless communications system 200 that supports flow control feedback for full-duplex communications in accordance with one or more aspects of the present disclosure. The wireless communications system 200 may implement aspects of the wireless communications system 100. For example, the wireless communications system 200 may include a base station 105 and a UE 115, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, MIMO communications, or beamforming, or any combination thereof. The antennas of the base station 105 and the UE 115 may be located within one or more antenna arrays or antenna panels, which may support MIMO operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming for communications with the UE 115. Likewise, the UE 115 may have one or more antenna arrays that may support various MIMO or beamforming operations. Additionally, or alternatively, an antenna panel may support radio frequency beamforming for a signal transmitted via one or more antenna ports. The base station 105 and the UE 115 may thus be configured to support directional communications (e.g., beamformed communications) using the multiple antennas.

The base station 105 or the UE 115, or both may operate in a half-duplex mode or a full-duplex mode, or a combination thereof. For example, in a half-duplex mode, the UE 115 may either transmit uplink communications or receive downlink communications during one or more TTIs. In the full duplex mode, the UE 115 may simultaneously transmit uplink communications and receive downlink communications during the one or more TTIs. A TTI may span one or more time resources (e.g., symbols, mini-slots, slot, etc.) and one or more frequency resources (e.g., subcarriers, carriers, etc.).

In the example of FIG. 2, when the base station 105 and the UE 115 are configured with multiple antenna panels, where one antenna panel may be dedicated for downlink communications and another antenna panel may be dedicated for uplink communications, the base station 105 and the UE 115 may experience self-interference. Self-interference (e.g., self-interference 201) may be a result of simultaneously using multiple antenna panels for uplink communications and downlink communications (e.g., in full duplex communications). In some examples, the self-interference 201 may occur due to, for example, signal leakage between a transmit antenna 205 and a receive antenna 210. In some other examples, self-interference may also occur due to, for example, signal leakage between a transmit antenna 215 and the receive antenna 210, but this self-interference (not shown) may be less compared to the self-interference 201 between the transmit antenna 205 and the receive antenna 210.

In some cases, in order to limit self-interference at the UE 115 during full-duplex communications, it may be appropriate to change the configurations used for full-duplex communications. In particular, when the UE 115 fails to receive a downlink transmission from the base station 105 (e.g., experiences downlink failure) due to self-interference, it may be appropriate to adapt a configuration for full-duplex communications to limit self-interference for subsequent downlink transmissions. However, as described with reference to FIG. 1, the base station 105 may not have sufficient information to determine a reason for downlink failure in a full-duplex mode. For instance, the base station 105 may be unable to determine whether downlink failure is due to a bad channel or strong self-interference. Accordingly, the base station 105 may be incapable of taking different actions to prevent downlink failure depending on the reason for the downlink failure.

As described herein, the UE 115 in wireless communications system 100 may support efficient techniques for informing the base station 105 of a reason for downlink failure. In particular, when the UE 115 fails to receive a downlink transmission 220 from the base station 105, the UE 115 may generate feedback associated with self-interference at the UE 115 (e.g., self-interference feedback 224). The UE 115 may then transmit the self-interference feedback 224 in a report 225 (e.g., feedback message) indicating that the UE 115 failed to receive the downlink transmission

220. That is, the UE 115 may feedback additional information related to self-interference along with a downlink NACK to the base station 105. The base station 105 may use the self-interference feedback 224 to update a configuration for full-duplex communications with the UE 115 (e.g., a configuration 230). In some examples, the base station 105 may transmit to the UE 115, the configuration 230 based on the report 225 including the self-interference feedback 224. A configuration or configuration for full-duplex communications (e.g., the configuration 230) described herein may refer to an uplink transmit beam used by the UE 115 to transmit uplink transmissions during full-duplex communications, a downlink receive beam used by the UE 115 to receive downlink transmissions during full-duplex communications, or an MCS, PMI, RI, etc. used for uplink or downlink transmissions during full-duplex communications.

In one example, the feedback associated with self-interference may include indications of measured or estimated self-interference at the UE 115 or a ratio of measured or estimated self-interference at the UE 115 to downlink signal strength (e.g., of the downlink transmission 220). In this example, the base station 105 may receive the feedback and transmit a configuration to the UE 115 for full-duplex communications based on the measured or estimated self-interference at the UE 115 or the ratio of measured or estimated self-interference at the UE 115 to downlink signal strength. For instance, the configuration transmitted by the base station 105 to the UE 115 may reduce self-interference at the UE 115 to below a threshold or decrease the ratio of measured or estimated self-interference at the UE 115 to downlink signal strength to below a threshold.

In another example, the feedback associated with self-interference may include indications of an uplink power configuration used for an uplink transmission overlapping with the failed downlink transmission 220 or an indication of a suspected reason for failing to receive the downlink transmission 220 (e.g., one bit indicating whether the UE 115 failed to receive the downlink transmission 220 due to self-interference or poor channel conditions). In this example, the base station 105 may receive the feedback and transmit a configuration to the UE 115 for full-duplex communications based on the uplink configuration used for the uplink transmission or the indication of the suspected reason for failing to receive the downlink transmission. For instance, the base station 105 may update a configuration at the UE used for full-duplex communications if the suspected reason for failing to receive the downlink transmission 220 is self-interference. Further, the base station 105 may update the uplink power configuration at the UE for subsequent uplink transmissions based on the indication of the uplink power configuration used for an uplink transmission overlapping with the failed downlink transmission 220.

In yet another example, the feedback associated with self-interference may include indications of a recommended beam pair for full-duplex communications (e.g., transmit and receive beam at the UE 115) or a recommended uplink power configuration for the corresponding full-duplex link. In this example, the base station 105 may receive the feedback and transmit a configuration to the UE 115 for full-duplex communications based on the recommended beam pair and recommended uplink power configuration. For instance, the base station 105 may indicate that the UE 115 is to use the recommended beam pair for full-duplex communications, or the base station 105 may indicate that the UE 115 is to use a beam pair selected based on the recommended beam pair for full-duplex communications. Similarly, the base station 105 may indicate that the UE 115 is to use the recommended uplink power configuration for full-duplex communications, or the base station 105 may indicate that the UE 115 is to use an uplink power configuration selected based on the recommended uplink power configuration for full-duplex communications.

In yet another example, if the UE 115 failed to receive the downlink transmission 220 based on transmitting an uplink grant-free transmission at the same time as the downlink transmission (e.g., on overlapping time resources or overlapping in the time domain), the feedback associated with self-interference may include an indication that the UE 115 transmitted the grant-free transmission that overlaps in the time domain with the downlink transmission 220. Accordingly, the base station 105 may be able to infer the reason for downlink failure (e.g., self-interference). In this example, the base station 105 may receive the feedback and transmit a configuration to the UE 115 for full-duplex communications based on the indication that the UE 115 transmitted the grant-free transmission that overlaps in the time domain with the downlink transmission 220.

Without the indication that the UE 115 transmitted the grant-free transmission that overlaps in the time domain with the downlink transmission 220, the base station 105 may not be able to determine that the UE 115 transmitted the grant-free transmission (e.g., since the grant-free transmission may be preconfigured by RRC). In particular, the UE 115 may not transmit a grant-free transmission on every available resource for pre-allocated for grant-free transmissions (e.g., the UE 115 may skip the grant-free transmission when there is no data or low data in a buffer at the UE 115). Thus, the base station 105 may not have clear knowledge of whether a grant-free uplink transmission is transmitted and whether self-interference caused the downlink failure. In some examples, the base station may blind detect the power on the resources allocated for the grant-free uplink transmission to estimate if the grant-free uplink transmission is transmitted. However, the estimate may not be available or accurate due to noise or interference. Further, the estimate may not be available if the UE 115 connects to a different base station (or cell) for downlink and uplink communications (e.g., since the downlink base station may not have knowledge of an uplink transmission receive by another base station at the same time).

In some aspects, the UE 115 may transmit the report 225 with the feedback associated with self-interference in a control channel (e.g., a physical uplink control channel (PUCCH)) or a data channel (e.g., a physical uplink shared channel (PUSCH)). Further, the UE 115 may also transmit the feedback associated with self-interference based on a request from the base station 105. As an example, the UE 115 may transmit a NACK in a PUCCH, and a base station 105 may transmit a grant to the UE 115 allocating resources for the UE 115 to transmit the feedback associated with self-interference in a PUSCH. The UE 115 may then transmit the feedback associated with self-interference in the PUSCH (e.g., in a MAC control element (MAC-CE) in the PUSCH). Additionally, or alternatively, the base station 105 may configure the UE 115 to transmit or avoid transmitting the feedback associated with self-interference. For instance, the base station 105 may transmit RRC signaling to the UE 115 indicating whether the UE 115 is to include feedback associated with self-interference in a report or feedback message. The base station 105 may also configure the information or indications to include in the feedback associated with the self-interference. The UE 115 may then autonomously send feedback associated with self-interference with NACKs (e.g., after the configuration, if the UE 115 is configured to send the feedback associated with self-interference).

Figure 3:
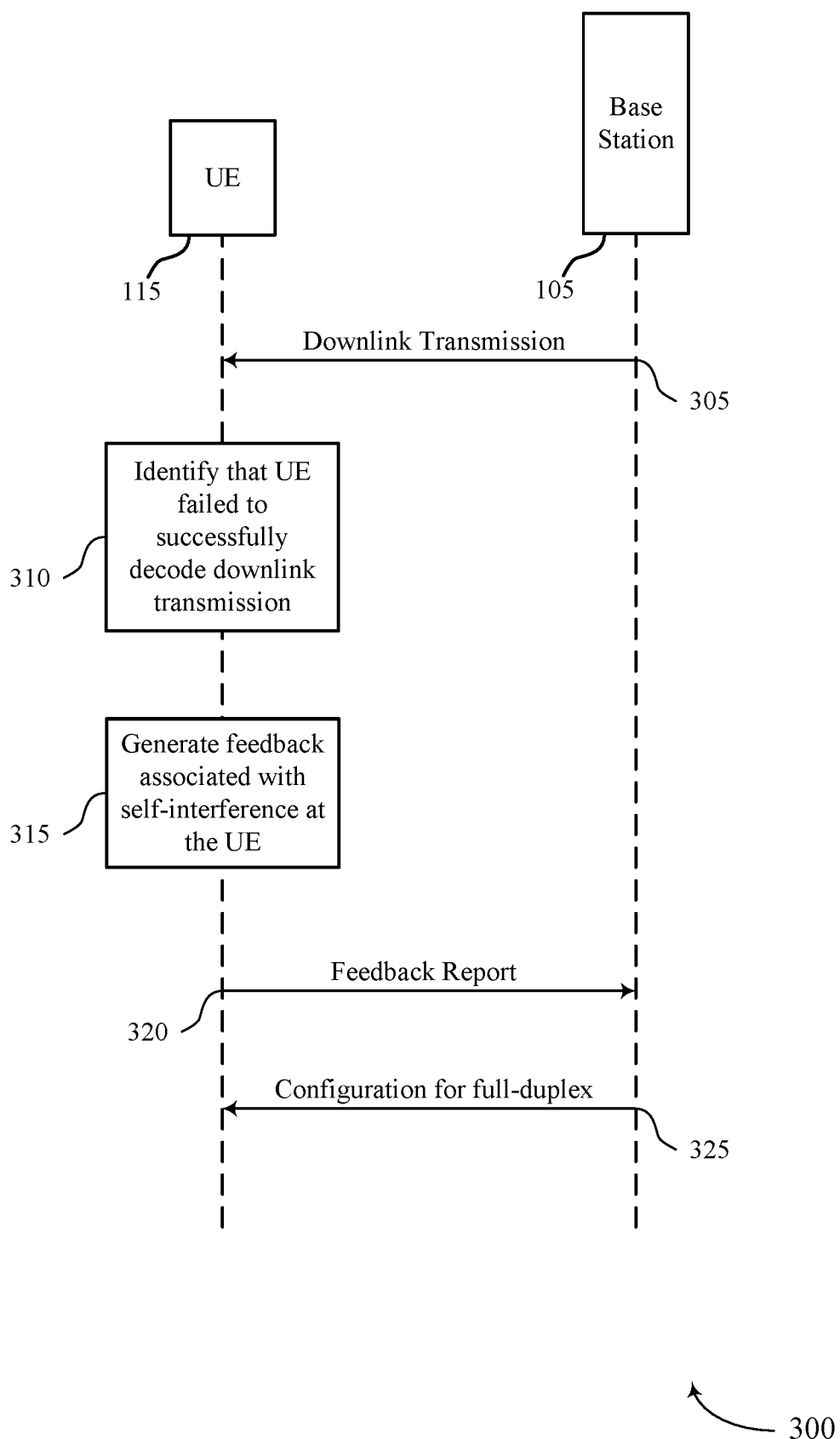
FIG. 3 illustrates an example of a process flow that supports flow control feedback for full-duplex communications in accordance with one or more aspects of the present disclosure.

FIG. 3 illustrates an example of a process flow 300 that supports flow control feedback for full-duplex communications in accordance with one or more aspects of the present disclosure. The process flow 300 may implement aspects of the wireless communications system 100 and the wireless communications system 200 described with reference to FIGS. 1 and 2, respectively. In the example of FIG. 3, a UE 115 may operate in a half-duplex mode or a full-duplex mode, or a combination thereof. The process flow 300 may be based on a configuration by a base station 105 and implemented by a UE 115 to promote power saving for the UE 115 when operating in a full-duplex mode. The process flow 300 may also be based on a configuration by the base station 105 and implemented by the UE 115 to promote high reliability and low latency wireless communications.

In the following description of the process flow 300, the operations between the base station 105 and the UE 115 may be transmitted in a different order than the example order shown, or the operations performed by the base station 105 and the UE 115 may be performed in different orders or at different times. Some operations may also be omitted from the process flow 300, and other operations may be added to the process flow 300. The base station 105 and the UE 115 may be examples of a base station 105 and a UE 115 as described with reference to FIGS. 1 and 2, respectively.

At 305, the base station 105 may transmit a downlink transmission to the UE 115. At 310, the UE 115 may identify that the UE 115 failed to successfully decode the downlink transmission from the base station 105. At 315, the UE 115 may generate feedback associated with self-interference at the UE 115 based on failing to successfully decode the downlink transmission and based on the UE 115 operating in a full-duplex mode. The UE 115 may then generate a report or a feedback message to transmit to the base station 105 indicating that the UE 115 failed to successfully decode the downlink transmission, where the report includes the feedback associated with self-interference at the UE 115 based on the UE 115 operating in the full-duplex mode. At 320, the UE 115 may transmit the report with the feedback associated with self-interference at the UE 115 to the base station 105. At 325, the base station 105 may transmit, and the UE 115 may receive, a configuration for full-duplex communications between the UE and the base station based on the report with the feedback associated with self-interference at the UE 115.

In some cases, the UE 115 may generate feedback including a measurement of self-interference at the UE 115, a ratio of self-interference at the UE 115 to downlink signal strength of the downlink transmission, or both, and transmit the feedback to the base station 105. In such cases, the base station 105 may transmit the configuration for the full-duplex communications to the UE 115 based on the measurement of self-interference at the UE, the ratio of self-interference at the UE to downlink signal strength, or both.

In some cases, the UE 115 may determine that the UE failed to successfully decode the downlink transmission based on self-interference caused by an uplink transmission from the UE 115. As such, the UE 115 may generate feedback including an uplink power configuration at the UE used for transmitting the uplink transmission, an indication that the UE failed to successfully decode the downlink transmission based at least in part on the self-interference, or both, and transmit the feedback to the base station 105. In such cases, the base station 105 may transmit the configuration for the full-duplex communications to the UE 115 based on the uplink power configuration, the indication that the UE failed to successfully decode the downlink transmission based at least in part on self-interference, or both.

In some cases, the UE 115 may generate feedback including a recommended beam pair for full-duplex communications with the base station, a recommended uplink power configuration for full-duplex communications with the base station, or both. In such cases, the base station 105 may transmit the configuration for the full-duplex communications to the UE 115 based on the recommended beam pair for full-duplex communications, the recommended uplink power configuration for full-duplex communications, or both.

In some cases, the UE 115 may transmit an SPS uplink transmission (e.g., grant-free uplink transmission) that overlaps in a time domain with the downlink transmission. As such, the UE 115 may generate feedback including an indication that the UE transmitted the SPS uplink transmission that overlaps in the time domain with the downlink transmission. In such cases, the base station 105 may transmit the configuration for the full-duplex communications to the UE 115 based on the indication that the UE transmitted the SPS uplink transmission that overlaps in the time domain with the downlink transmission.

Figure 4:
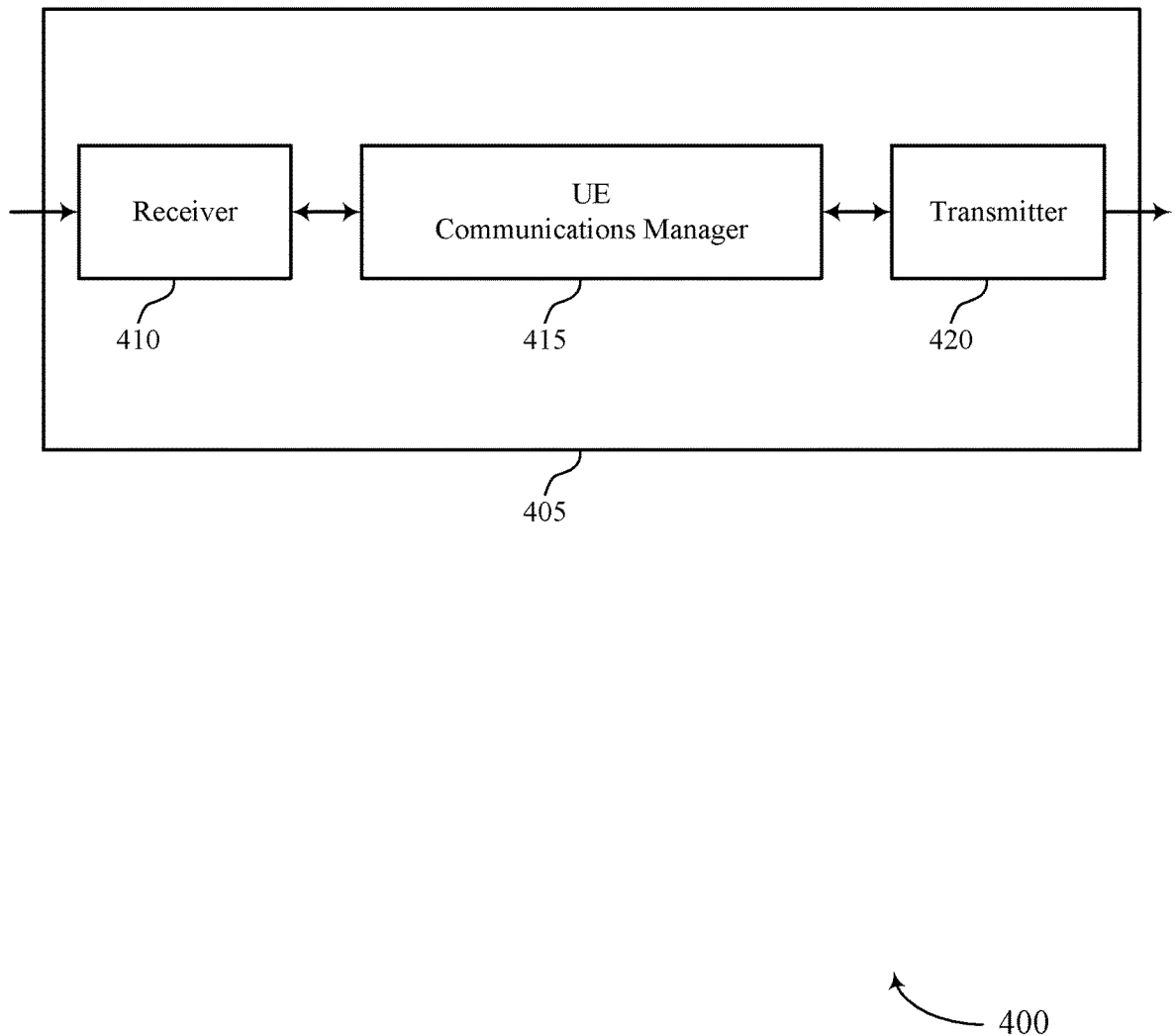
FIGS. 4 and 5 show block diagrams of devices that support flow control feedback for full-duplex communications in accordance with one or more aspects of the present disclosure.

FIG. 4 shows a block diagram 400 of a device 405 that supports flow control feedback for full-duplex communications in accordance with one or more aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to flow control feedback for full-duplex communications, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may be implemented as an integrated circuit or chipset for the device 405, and the receiver 410 and the transmitter 420 may be implemented as analog components (for example, amplifiers, filters, antennas) coupled with the device 405 modem to enable wireless transmission and reception. The actions performed by the UE communications manager 415 as described herein may be implemented to realize one or more potential enhancements. At least one implementation may enable the UE communications manager 415 to support full-duplex communications with limited self-interference while the device 405 is operating in a full-duplex mode.

For example, the UE communications manager 415 may identify that the device 405 failed to successfully decode a downlink transmission from a base station, generate feedback associated with self-interference at the device 405 based on the identifying and the device 405 operating in the full-duplex mode, generate a report indicating that the device 405 failed to successfully decode the downlink transmission, the report including the feedback associated with self-interference at the device 405 based on the device 405 operating in the full-duplex mode, and transmit the report with the feedback associated with self-interference at the device 405 to the base station. Based on transmitting the report including the feedback associated with self-interference at the device 405, one or more processors of the device 405 (for example, processor(s) controlling or incorporated with the UE communications manager 415) may experience power savings (e.g., increased battery life) since the UE may successfully receive subsequent downlink transmissions and may not have to continue monitoring for retransmissions.

Additionally or alternatively, the UE communications manager 415 may generate a report, the report including the feedback associated with self-interference at the device 405 based on the full-duplex mode, and transmit the report with the feedback associated with self-interference at the device 405. Based on transmitting the report including the feedback associated with self-interference at the UE, one or more processors of the device 405 (for example, processor(s) controlling or incorporated with the UE communications manager 415) may experience power savings (e.g., increased battery life) since the device 405 may successfully receive subsequent downlink transmissions and may not have to continue monitoring for retransmissions.

The UE communications manager 415 may be an example of means for performing various aspects of managing flow control feedback for full-duplex communications as described herein. The UE communications manager 415, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure. In some examples, the UE communications manager 415 may be configured to perform various operations (e.g., receiving, determining, transmitting) using or otherwise in cooperation with the receiver 410, the transmitter 420, or both.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
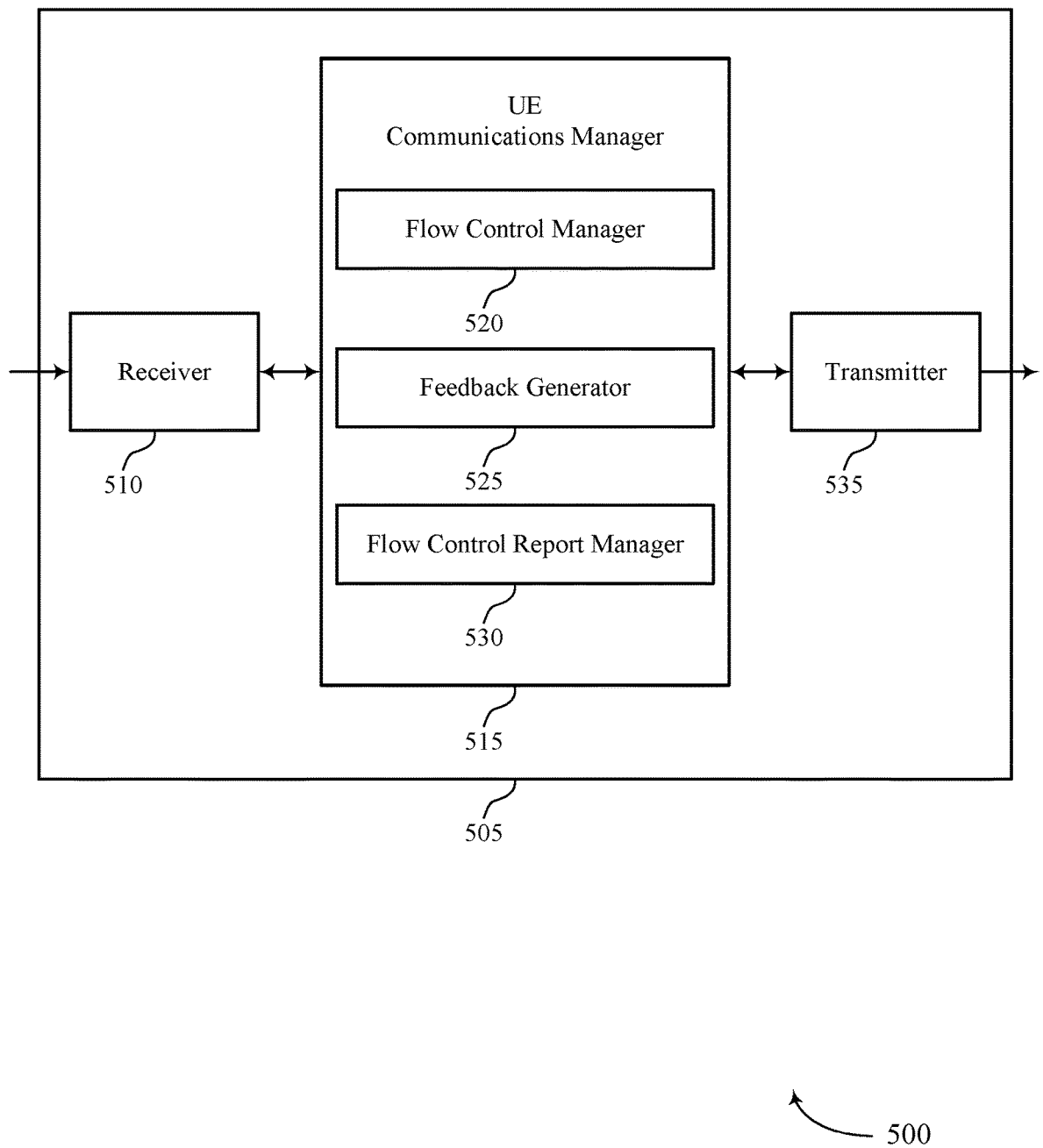

FIG. 5 shows a block diagram 500 of a device 505 that supports flow control feedback for full-duplex communications in accordance with one or more aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to flow control feedback for full-duplex communications, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a flow control manager 520, a feedback generator 525, and a flow control report manager 530. The UE communications manager 515 may be an example of aspects of the UE communications manager 710 described herein.

The flow control manager 520 may identify that the UE failed to successfully decode a downlink transmission from a base station. The feedback generator 525 may generate feedback associated with self-interference at the UE based on the identifying and the UE operating in the full-duplex mode and generate a report indicating that the UE failed to successfully decode the downlink transmission, the report including the feedback associated with self-interference at the UE based on the UE operating in the full-duplex mode. The flow control report manager 530 may transmit the report with the feedback associated with self-interference at the UE to the base station.

Additionally or alternatively, the feedback generator 525 may generate feedback associated with self-interference at the device 505 based on the device 505 failing to successfully decode a downlink transmission when in the full-duplex mode and generate a report, the report including the feedback associated with self-interference at the device 505 based on the full-duplex mode. The flow control report manager 530 may transmit the report with the feedback associated with self-interference at the device 505.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
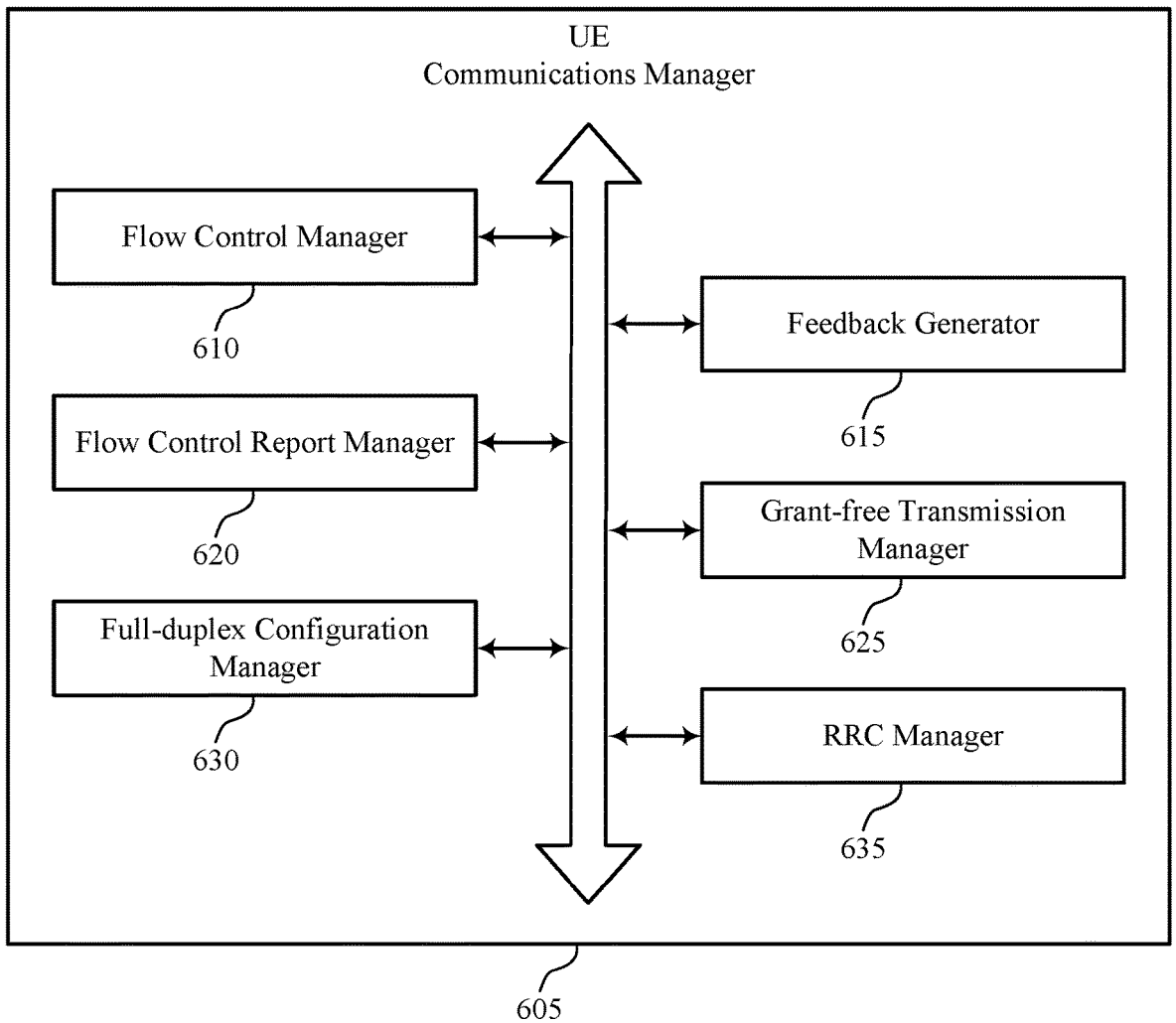
FIG. 6 shows a block diagram of a UE communications manager that supports flow control feedback for full-duplex communications in accordance with one or more aspects of the present disclosure.

FIG. 6 shows a block diagram 600 of a UE communications manager 605 that supports flow control feedback for full-duplex communications in accordance with one or more aspects of the present disclosure. The UE communications manager 605 may be an example of aspects of a UE communications manager 415, a UE communications manager 515, or a UE communications manager 710 described herein. The UE communications manager 605 may include a flow control manager 610, a feedback generator 615, a flow control report manager 620, a grant-free transmission manager 625, a full-duplex configuration manager 630, and an RRC manager 635. Each of these modules may communicate, directly or indirectly, with one another (e.g., via one or more buses).

The flow control manager 610 may identify that the UE failed to successfully decode a downlink transmission from a base station. The feedback generator 615 may generate feedback associated with self-interference at the UE based on the identifying and the UE operating in the full-duplex mode. In some examples, the feedback generator 615 may generate a report indicating that the UE failed to successfully decode the downlink transmission, the report including the feedback associated with self-interference at the UE based on the UE operating in the full-duplex mode. The flow control report manager 620 may transmit the report with the feedback associated with self-interference at the UE to the base station. Additionally or alternatively, the feedback generator 615 may generate feedback associated with self-interference at the UE based on the UE failing to successfully decode a downlink transmission when in the full-duplex mode. In some examples, the feedback generator 615 may generate a report, the report including the feedback associated with the self-interference at the UE based on the full-duplex mode. The flow control report manager 620 may transmit the report with the feedback associated with the self-interference at the UE.

In some examples, the feedback generator 615 may generate feedback including a measurement of self-interference at the UE, a ratio of self-interference at the UE to downlink signal strength of the downlink transmission, or both. In some examples, the flow control manager 610 may determine that the UE failed to successfully decode the downlink transmission based on self-interference caused by an uplink transmission from the UE, and the feedback generator 615 may generate feedback including an uplink power configuration at the UE used for transmitting the uplink transmission, an indication that the UE failed to successfully decode the downlink transmission based at least in part on the self-interference, or both. In some examples, the feedback generator 615 may generate feedback including a recommended beam pair for full-duplex communications with the base station, a recommended uplink power configuration for full-duplex communications with the base station, or both. The grant-free transmission manager 625 may transmit a semi-persistent scheduling uplink transmission that overlaps in a time domain with the downlink transmission. The feedback generator 615 may then generate feedback including an indication that the UE transmitted the semi-persistent scheduling uplink transmission that overlaps in the time domain with the downlink transmission.

The full-duplex configuration manager 630 may receive a configuration for full-duplex communications between the UE and the base station based on transmitting the report with the feedback associated with self-interference at the UE to the base station. In some examples, the flow control report manager 620 may transmit the report with the feedback associated with self-interference at the UE to the base station in a control channel, data channel, or both. In some examples, the flow control report manager 620 may transmit a first stage of the report to the base station in the control channel, receive a grant allocating resources in the data channel for the UE to transmit a second stage of the report, and transmit the second stage of the report in the data channel based on receiving the grant, where the second stage of the report includes the feedback associated with self-interference at the UE. The RRC manager 635 may receive RRC signaling indicating that the UE is to include the feedback associated with self-interference at the UE in the report when the UE is operating in the full-duplex mode.

Figure 7:
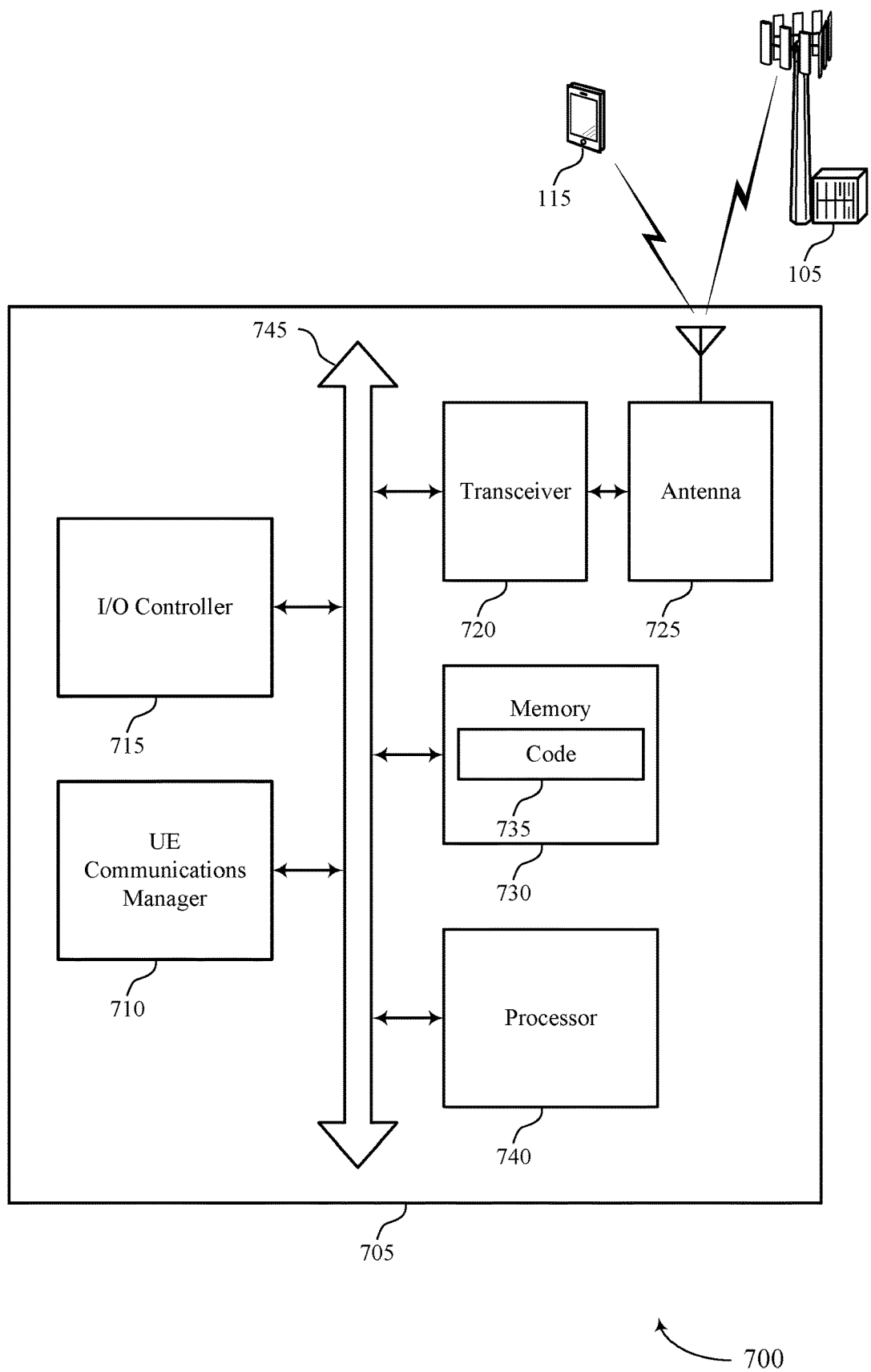
FIG. 7 shows a diagram of a system including a device that supports flow control feedback for full-duplex communications in accordance with one or more aspects of the present disclosure.

FIG. 7 shows a diagram of a system 700 including a device 705 that supports flow control feedback for full-duplex communications in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

At least one implementation may enable the UE communications manager 710 to support full-duplex communications with limited self-interference. For example, the UE communications manager 710 may identify that the device 705 failed to successfully decode a downlink transmission from a base station, generate feedback associated with self-interference at the device 705 based on the identifying and the device 705 operating in the full-duplex mode, generate a report indicating that the device 705 failed to successfully decode the downlink transmission, the report including the feedback associated with self-interference at the device 705 based on the device 705 operating in the full-duplex mode, and transmit the report with the feedback associated with self-interference at the device 705 to the base station. Based on transmitting the report including the feedback associated with self-interference at the device 705, one or more processors of the device 705 (for example, processor(s) controlling or incorporated with the UE communications manager 710) may experience power savings (e.g., increased battery life) since the device 705 may successfully receive subsequent downlink transmissions and may not have to continue monitoring for retransmissions.

Additionally or alternatively, the UE communications manager 710 may generate feedback associated with self-interference at the device 705 based on the device 705 failing to successfully decode a downlink transmission when in the full-duplex mode, generate a report, the report including the feedback associated with the self-interference at the device 705 based on the full-duplex mode, and transmit the report with the feedback associated with the self-interference at the device 705. Based on transmitting the report including the feedback associated with the self-interference at the device 705, one or more processors of the device 705 (for example, processor(s) controlling or incorporated with the UE communications manager 710) may experience power savings (e.g., increased battery life) since the device 705 may successfully receive subsequent downlink transmissions and may not have to continue monitoring for retransmissions.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller

715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices. In some examples, the memory 730 may temporarily store information (e.g., uplink control information, uplink data, etc.). The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting flow control feedback for full-duplex communications).

Figure 8:
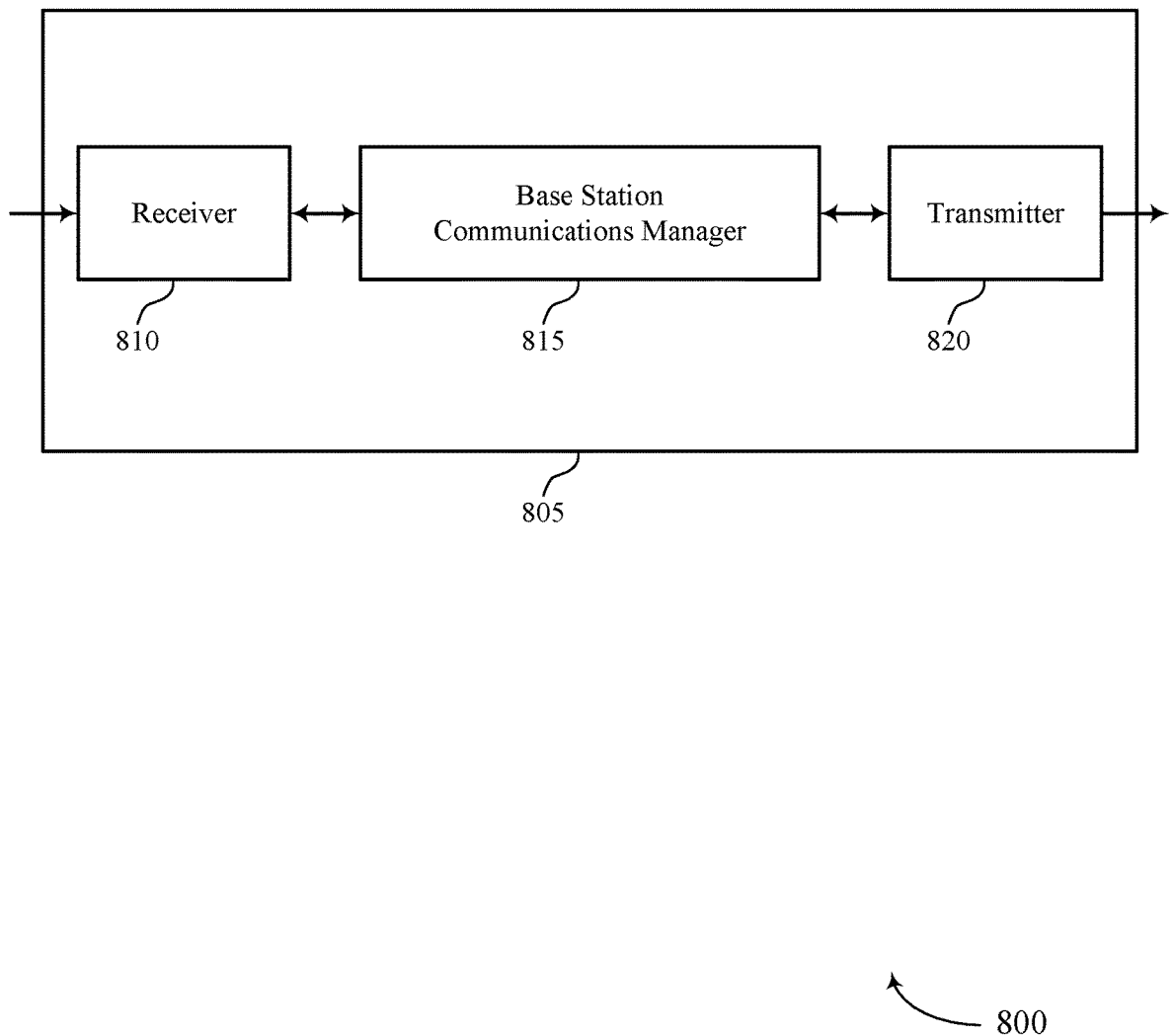
FIGS. 8 and 9 show block diagrams of devices that support flow control feedback for full-duplex communications in accordance with one or more aspects of the present disclosure.

FIG. 8 shows a block diagram 800 of a device 805 that supports flow control feedback for full-duplex communications in accordance with one or more aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to flow control feedback for full-duplex communications, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may transmit a downlink transmission to a UE, receive a report from the UE indicating that the UE failed to successfully decode the downlink transmission, where the report includes feedback associated with self-interference at the UE based on the UE operating in a full-duplex mode, and transmit, to the UE, a configuration for full-duplex communications between the UE and the base station based on receiving the report with the feedback associated with self-interference. The base station communications manager 815 may be an example of aspects of the base station communications manager 1110 described herein.

Additionally or alternatively, the base station communications manager 815 may transmit a downlink transmission to a UE, receive a report from the UE, where the report includes the feedback associated with the self-interference at the UE based on the UE operating in a full-duplex mode, and transmit, to the UE, a configuration for full-duplex communications between the UE and the base station based on the report including the feedback associated with the self-interference. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
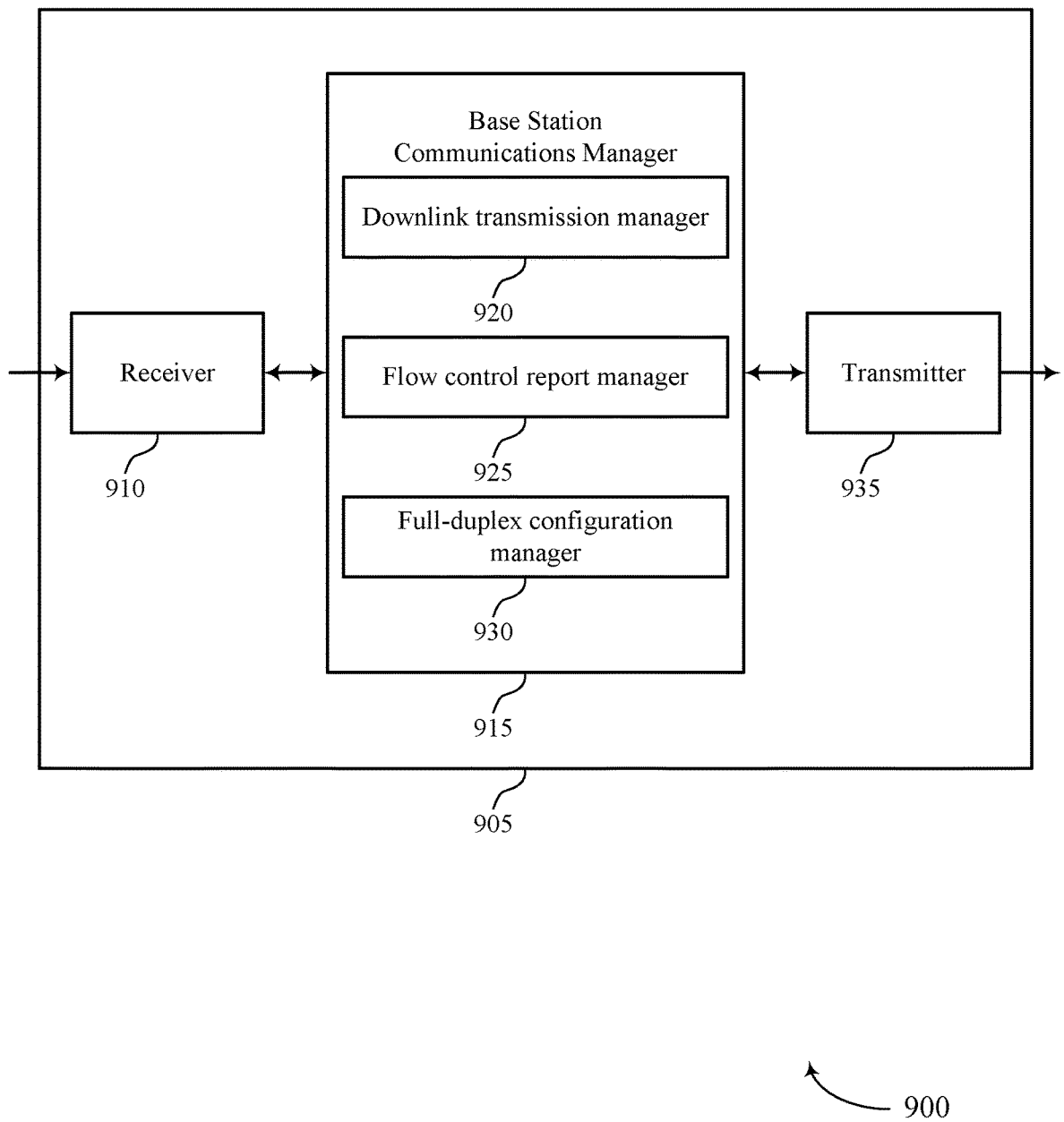

FIG. 9 shows a block diagram 900 of a device 905 that supports flow control feedback for full-duplex communications in accordance with one or more aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to flow control feedback for full-duplex communications, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a downlink transmission manager 920, a flow control report manager 925, and a full-duplex configuration manager 930. The base station communications manager 915 may be an example of aspects of the base station communications manager 1110 described herein.

The downlink transmission manager 920 may transmit a downlink transmission to a UE. The flow control report manager 925 may receive a report from the UE indicating that the UE failed to successfully decode the downlink transmission, where the report includes feedback associated with self-interference at the UE based on the UE operating in a full-duplex mode. The full-duplex configuration manager 930 may transmit, to the UE, a configuration for full-duplex communications between the UE and the base station based on receiving the report with the feedback associated with self-interference.

Additionally or alternatively, the downlink transmission manager 920 may transmit a downlink transmission to a UE. The flow control report manager 925 may receive a report from the UE, where the report includes feedback associated with self-interference at the UE based on the UE operating in a full-duplex mode. The full-duplex configuration manager 930 may transmit, to the UE, a configuration for full-duplex communications between the UE and the base station based on the report including the feedback associated with the self-interference.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
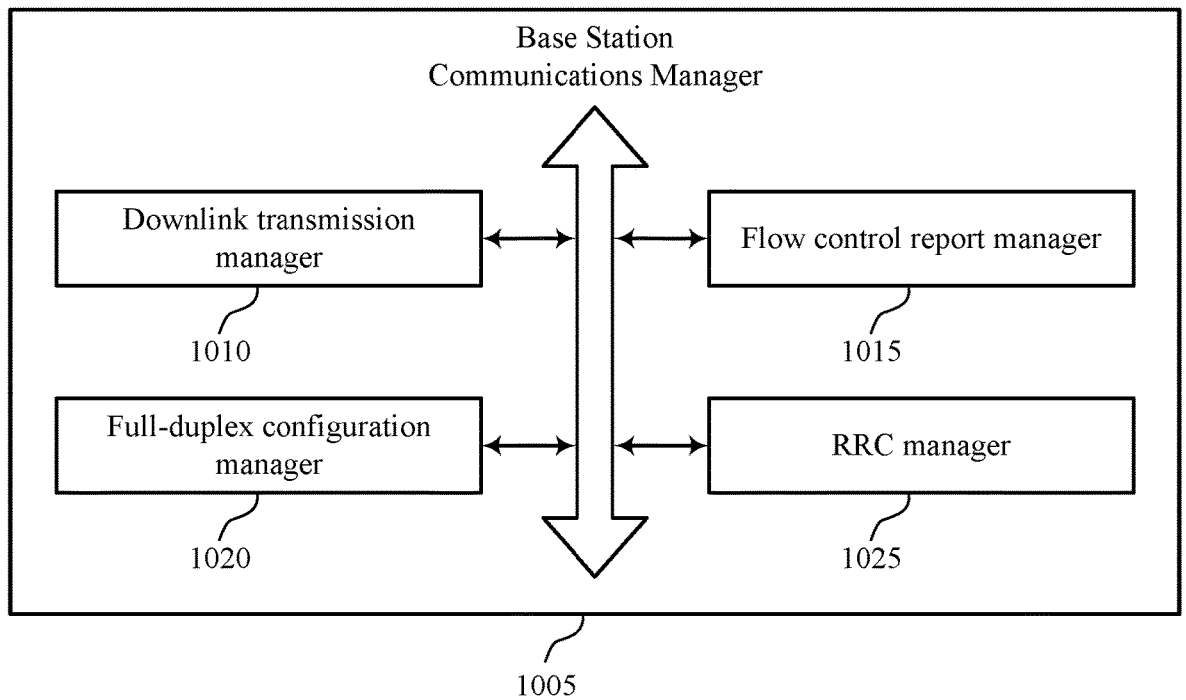
FIG. 10 shows a block diagram of a base station communications manager that supports flow control feedback for full-duplex communications in accordance with one or more aspects of the present disclosure.

FIG. 10 shows a block diagram 1000 of a base station communications manager 1005 that supports flow control feedback for full-duplex communications in accordance with one or more aspects of the present disclosure. The base station communications manager 1005 may be an example of aspects of a base station communications manager 815, a base station communications manager 915, or a base station communications manager 1110 described herein. The base station communications manager 1005 may include a downlink transmission manager 1010, a flow control report manager 1015, a full-duplex configuration manager 1020, and an RRC manager 1025. Each of these modules may communicate, directly or indirectly, with one another (e.g., via one or more buses).

The downlink transmission manager 1010 may transmit a downlink transmission to a UE. The flow control report manager 1015 may receive a report from the UE indicating that the UE failed to successfully decode the downlink transmission, where the report includes feedback associated with self-interference at the UE based on the UE operating in a full-duplex mode. The full-duplex configuration manager 1020 may transmit, to the UE, a configuration for full-duplex communications between the UE and the base station based on receiving the report with the feedback associated with self-interference. Additionally or alternatively, the downlink transmission manager 1010 may transmit a downlink transmission to a UE. The flow control report manager 1015 may receive a report from the UE, where the report includes the feedback associated with the self-interference at the UE based on the UE operating in a full-duplex mode. The full-duplex configuration manager 1020 may transmit, to the UE, a configuration for full-duplex communications between the UE and the base station based on the report including the feedback associated with the self-interference.

In some examples, the feedback associated with self-interference at the UE includes a measurement of self-interference at the UE, a ratio of self-interference at the UE to downlink signal strength of the downlink transmission, or both. In such examples, the full-duplex configuration manager 1020 may transmit the configuration for the full-duplex communications to the UE based on the measurement of self-interference at the UE, the ratio of self-interference at the UE to downlink signal strength, or both. In some examples, the feedback associated with self-interference at the UE includes an uplink power configuration at the UE used for transmitting an uplink transmission causing self-interference on the downlink transmission, an indication that the UE failed to successfully decode the downlink transmission based at least in part on self-interference, or both. In such examples, the full-duplex configuration manager 1020 may transmit the configuration for the full-duplex communications to the UE based on the uplink power configuration, the indication that the UE failed to successfully decode the downlink transmission based on self-interference, or both.

In some examples, the feedback associated with self-interference at the UE comprises a recommended beam pair for full-duplex communications, a recommended uplink power configuration for full-duplex communications, or both. In such examples, the full-duplex configuration manager 1020 may transmit the configuration for the full-duplex communications to the UE based on the recommended beam pair for full-duplex communications, the recommended uplink power configuration for full-duplex communications, or both. In some examples, the feedback associated with self-interference at the UE comprises an indication that the UE transmitted a semi-persistent scheduling uplink transmission that overlaps in a time domain with the downlink transmission. In such examples, the full-duplex configuration manager 1020 may transmit the configuration for the full-duplex communications to the UE based on the indication that the UE transmitted the semi-persistent scheduling uplink transmission that overlaps in the time domain with the downlink transmission.

In some examples, the flow control report manager 1015 may receive the report with the feedback associated with self-interference at the UE from the UE in a control channel, data channel, or both. In some examples, the flow control report manager 1015 may receive a first stage of the report from the UE in the control channel, transmit a grant allocating resources in the data channel for the UE to transmit a second stage of the report, and receive the second stage of the report in the data channel based on transmitting the grant, where the second stage of the report includes the feedback associated with self-interference at the UE. The RRC manager 1025 may transmit RRC signaling indicating that the UE is to include the feedback associated with self-interference at the UE in the report when the UE is operating in the full-duplex mode.

Figure 11:
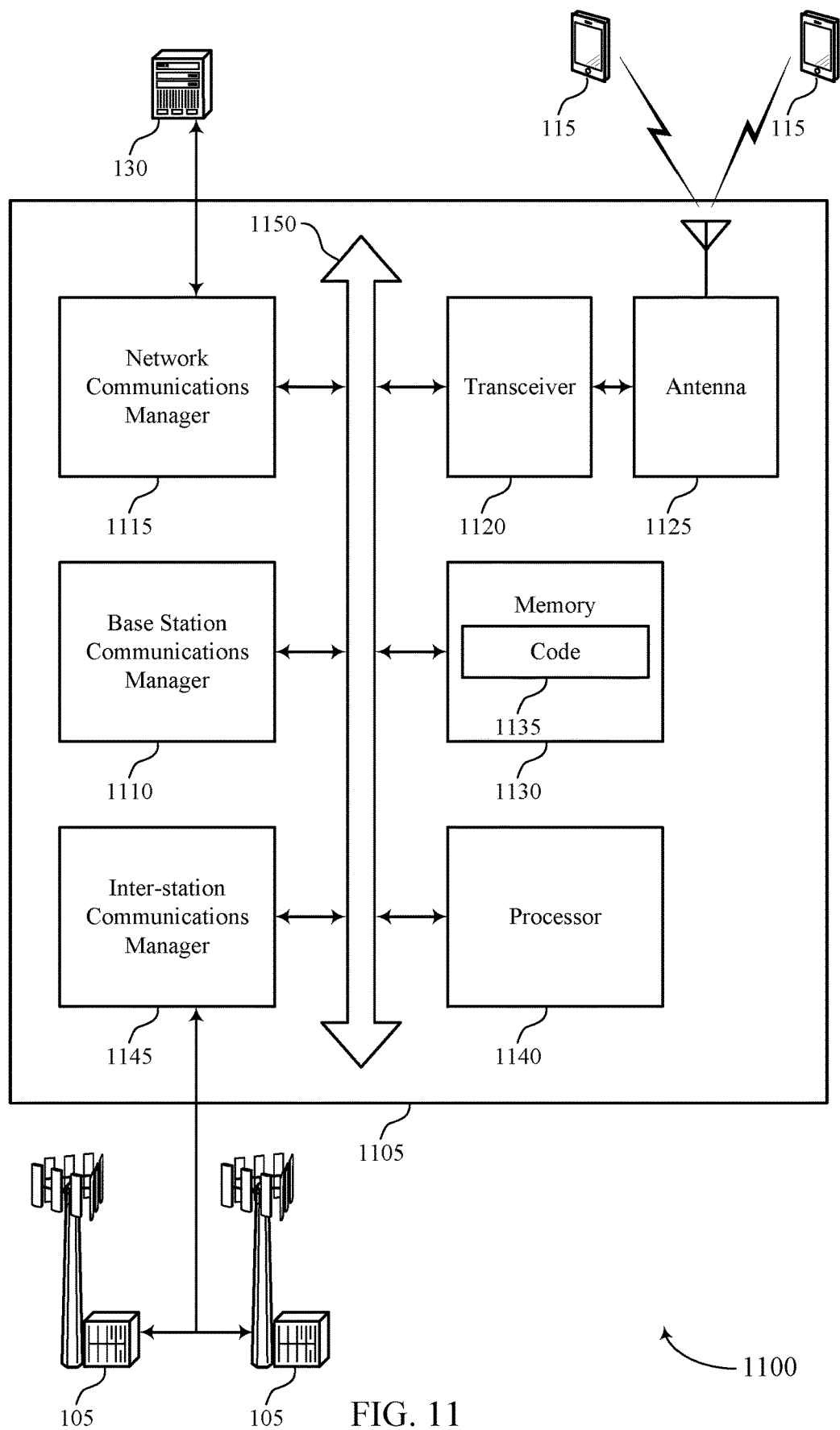
FIG. 11 shows a diagram of a system including a device that supports flow control feedback for full-duplex communications in accordance with one or more aspects of the present disclosure.

FIG. 11 shows a diagram of a system 1100 including a device 1105 that supports flow control feedback for full-duplex communications in accordance with one or more aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may transmit a downlink transmission to a UE, receive a report from the UE indicating that the UE failed to successfully decode the downlink transmission, where the report includes feedback associated with self-interference at the UE based on the UE operating in a full-duplex mode, and transmit, to the UE, a configuration for full-duplex communications between the UE and the base station based on receiving the report with the feedback associated with self-interference.

Additionally or alternatively, the base station communications manager 1110 may transmit a downlink transmission to a UE, receive a report from the UE, where the report includes feedback associated with self-interference at the UE based on the UE operating in a full-duplex mode, and transmit, to the UE, a configuration for full-duplex communications between the UE and the base station based on the report including the feedback associated with the self-interference.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices. The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting flow control feedback for full-duplex communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
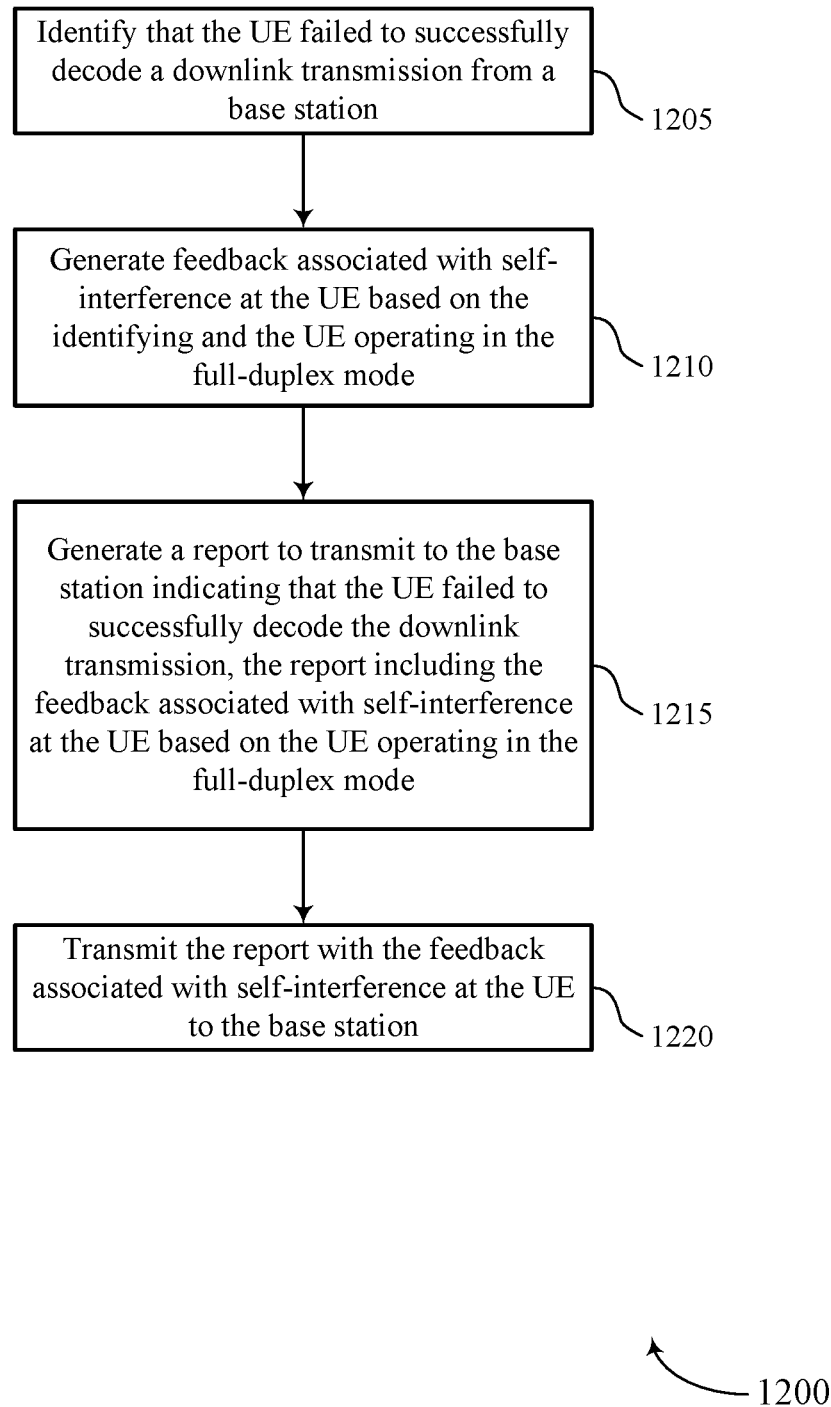
FIGS. 12 through 15 show flowcharts illustrating methods that support flow control feedback for full-duplex communications in accordance with one or more aspects of the present disclosure.

FIG. 12 shows a flowchart illustrating a method 1200 that supports flow control feedback for full-duplex communications in accordance with one or more aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may identify that the UE failed to successfully decode a downlink transmission from a base station. The operations of 1205 may be performed according to the methods described herein. In some examples, aspects of the operations of 1205 may be performed by a flow control manager as described with reference to FIGS. 4 through 7.

At 1210, the UE may generate feedback associated with self-interference at the UE based on the identifying and the UE operating in the full-duplex mode. The operations of 1210 may be performed according to the methods described herein. In some examples, aspects of the operations of 1210 may be performed by a feedback generator as described with reference to FIGS. 4 through 7.

At 1215, the UE may generate a report indicating that the UE failed to successfully decode the downlink transmission, the report including the feedback associated with self-interference at the UE based on the UE operating in the full-duplex mode. The operations of 1215 may be performed according to the methods described herein. In some examples, aspects of the operations of 1215 may be performed by a feedback generator as described with reference to FIGS. 4 through 7.

At 1220, the UE may transmit the report with the feedback associated with self-interference at the UE to the base station. The operations of 1220 may be performed according to the methods described herein. In some examples, aspects of the operations of 1220 may be performed by a flow control report manager as described with reference to FIGS. 4 through 7.

Figure 13:
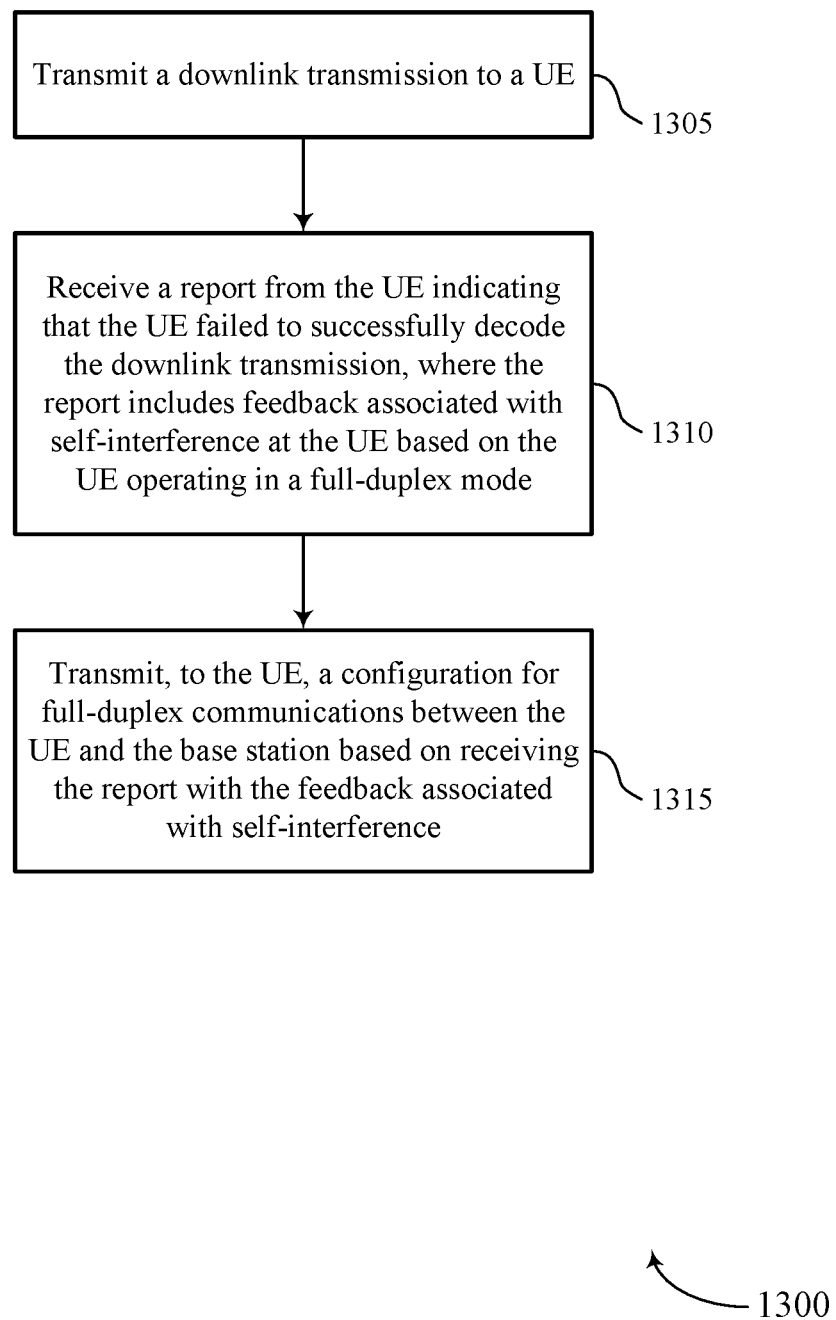

FIG. 13 shows a flowchart illustrating a method 1300 that supports flow control feedback for full-duplex communications in accordance with one or more aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1305, the base station may transmit a downlink transmission to a UE. The operations of 1305 may be performed according to the methods described herein. In some examples, aspects of the operations of 1305 may be performed by a downlink transmission manager as described with reference to FIGS. 8 through 11.

At 1310, the base station may receive a report from the UE indicating that the UE failed to successfully decode the downlink transmission, where the report includes feedback associated with self-interference at the UE based on the UE operating in a full-duplex mode. The operations of 1310 may be performed according to the methods described herein. In some examples, aspects of the operations of 1310 may be performed by a flow control report manager as described with reference to FIGS. 8 through 11.

At 1315, the base station may transmit, to the UE, a configuration for full-duplex communications between the UE and the base station based on receiving the report with the feedback associated with self-interference. The operations of 1315 may be performed according to the methods described herein. In some examples, aspects of the operations of 1315 may be performed by a full-duplex configuration manager as described with reference to FIGS. 8 through 11.

Figure 14:
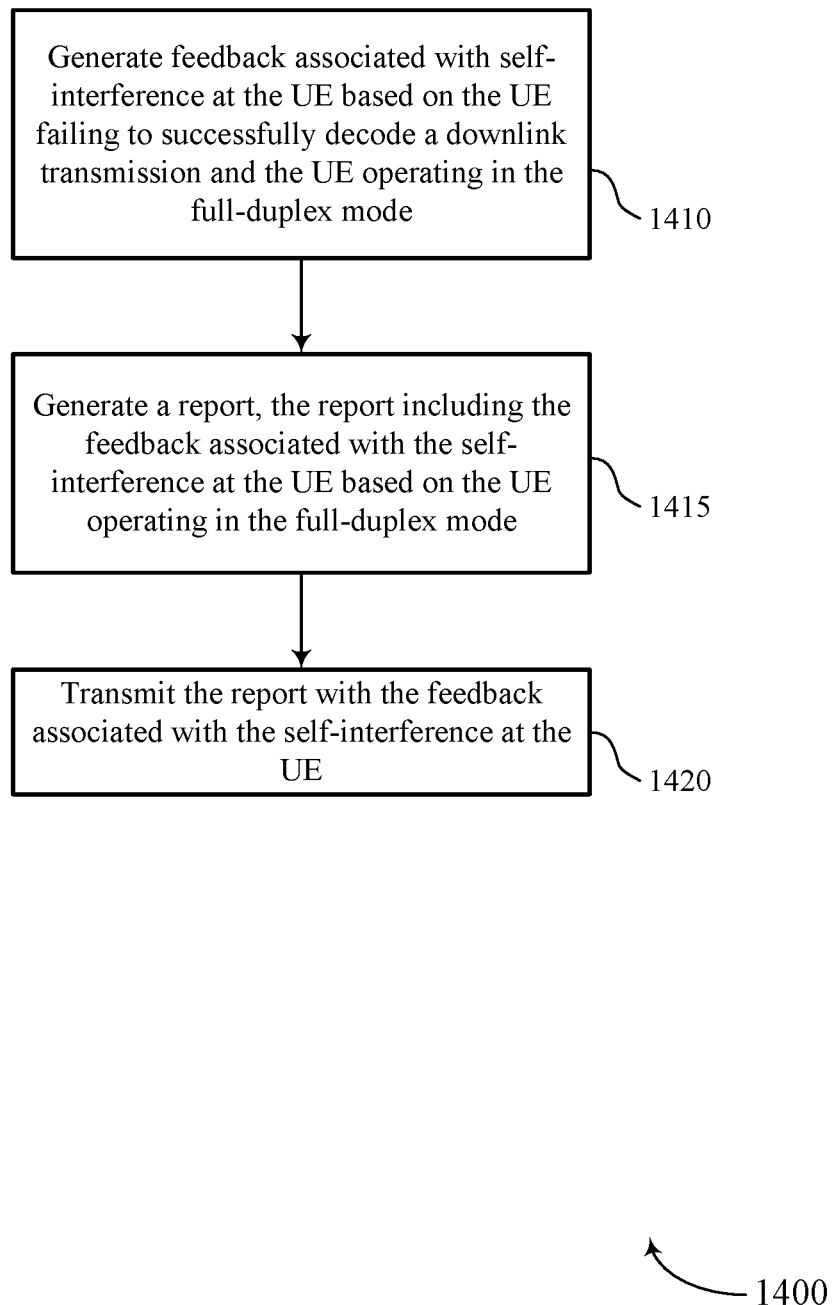

FIG. 14 shows a flowchart illustrating a method 1400 that supports flow control feedback for full-duplex communications in accordance with one or more aspects of the present disclosure. The operations of method 1400 may be implemented by a UE 115 or its components as described herein. For example, the operations of method 1400 may be performed by a communications manager as described with reference to FIGS. 4 through 7. In some examples, an apparatus may execute a set of instructions to control the functional elements of the apparatus to perform the functions described below. Additionally, or alternatively, an apparatus may perform aspects of the functions described below using special-purpose hardware.

At 1410, the UE may generate feedback associated with self-interference at the UE based on the UE failing to successfully decode a downlink transmission when in the full-duplex mode. The operations of 1410 may be performed according to the methods described herein. In some examples, aspects of the operations of 1410 may be performed by a feedback generator as described with reference to FIGS. 4 through 7.

At 1415, the UE may generate a report, the report including the feedback associated with self-interference at the UE based the full-duplex mode. The operations of 1415 may be performed according to the methods described herein. In some examples, aspects of the operations of 1415 may be performed by a feedback generator as described with reference to FIGS. 4 through 7.

At 1420, the apparatus may transmit the report with the feedback associated with self-interference at the UE. The operations of 1420 may be performed according to the methods described herein. In some examples, aspects of the operations of 1420 may be performed by a flow control report manager as described with reference to FIGS. 4 through 7.

Figure 15:
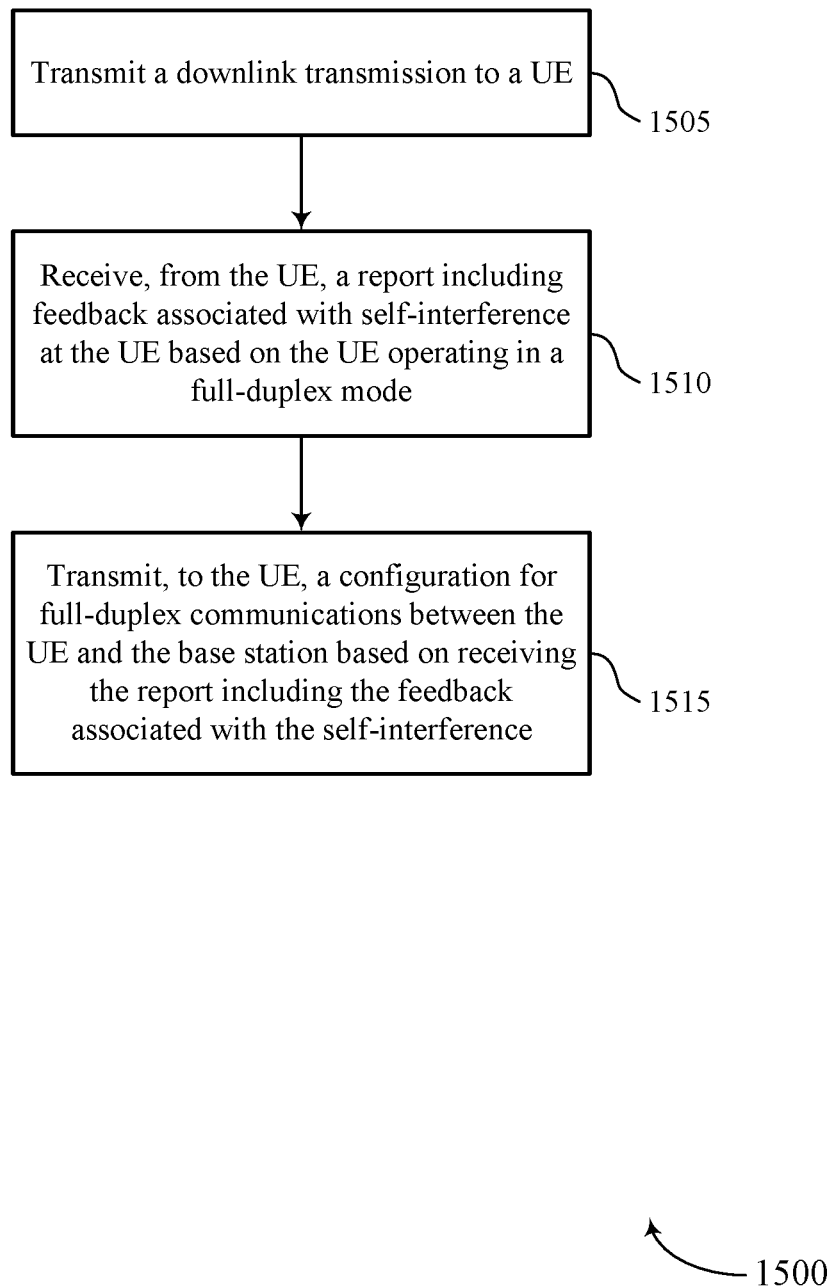

FIG. 15 shows a flowchart illustrating a method 1500 that supports flow control feedback for full-duplex communications in accordance with one or more aspects of the present disclosure. The operations of method 1500 may be implemented by a base station 105 or its components as described herein. For example, the operations of method 1500 may be performed by a communications manager as described with reference to FIGS. 8 through 11. In some examples, an apparatus may execute a set of instructions to control the functional elements of the apparatus to perform the functions described below. Additionally, or alternatively, an apparatus may perform aspects of the functions described below using special-purpose hardware.

At 1505, the base station may transmit a downlink transmission to a UE. The operations of 1505 may be performed according to the methods described herein. In some examples, aspects of the operations of 1505 may be performed by a downlink transmission manager as described with reference to FIGS. 8 through 11.

At 1510, the base station may receive a report from the UE, where the report includes feedback associated with self-interference at the UE based on the UE operating in a full-duplex mode. The operations of 1510 may be performed according to the methods described herein. In some examples, aspects of the operations of 1510 may be performed by a flow control report manager as described with reference to FIGS. 8 through 11.

At 1515, the base station may transmit, to the UE, a configuration for full-duplex communications between the UE and the base station based on the report including the feedback associated with self-interference. The operations of 1515 may be performed according to the methods described herein. In some examples, aspects of the operations of 1515 may be performed by a full-duplex configuration manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Aspect 1: A method for wireless communication at a UE, comprising: generating feedback associated with self-interference at the UE based at least in part on the UE failing to successfully decode a downlink transmission when in a full-duplex mode; generating a report, the report comprising the feedback associated with the self-interference at the UE based at least in part on the full-duplex mode; and transmitting the report with the feedback associated with the self-interference at the UE.

Aspect 2: The method of aspect 1, wherein the report indicates that the UE failed to successfully decode the downlink transmission.

Aspect 3: The method of aspects 1 and 2, wherein generating the feedback associated with the self-interference at the UE comprises: generating the feedback comprising a measurement of the self-interference at the UE, a ratio of the self-interference at the UE to downlink signal strength of the downlink transmission, or both.

Aspect 4: The method of aspects 1 through 3, further comprising: determining that the UE failed to successfully decode the downlink transmission based at least in part on the self-interference caused by an uplink transmission from the UE, wherein generating the feedback associated with the self-interference at the UE comprises: generating the feedback comprising an uplink power configuration at the UE used for transmitting the uplink transmission, an indication that the UE failed to successfully decode the downlink transmission based at least in part on the self-interference, or both.

Aspect 5: The method of aspects 1 through 4, wherein generating the feedback associated with the self-interference at the UE comprises: generating the feedback comprising a recommended beam pair for full-duplex communications with the base station, a recommended uplink power configuration for full-duplex communications with the base station, or both.

Aspect 6: The method of aspects 1 through 5, further comprising: transmitting a semi-persistent scheduling uplink transmission that overlaps in a time domain with the downlink transmission, wherein generating the feedback associated with self-interference at the UE comprises: generating the feedback comprising an indication that the UE transmitted the semi-persistent scheduling uplink transmission that overlaps in the time domain with the downlink transmission.

Aspect 7: The method of aspects 1 through 6, further comprising: receiving a configuration for full-duplex communications between the UE and the base station based at least in part on transmitting the report with the feedback associated with the self-interference at the UE.

Aspect 8: The method of aspects 1 through 7, further comprising: receiving RRC signaling indicating that the UE is to include the feedback associated with the self-interference at the UE in the report when the UE is operating in the full-duplex mode.

Aspect 9: A method for wireless communication at a base station, comprising: transmitting a downlink transmission to a UE; receiving, from the UE, a report comprising feedback associated with self-interference at the UE based at least in part on the UE operating in a full-duplex mode; and transmitting, to the UE, a configuration for full-duplex communications between the UE and the base station based at least in part on the report comprising the feedback associated with the self-interference.

Aspect 10: The method of aspect 9, wherein the report indicates that the UE failed to successfully decode the downlink transmission.

Aspect 11: The method of aspects 9 and 10, wherein the feedback associated with the self-interference at the UE comprises a measurement of the self-interference at the UE, a ratio of the self-interference at the UE to downlink signal strength of the downlink transmission, or both, and wherein transmitting the configuration for the full-duplex communications to the UE comprises: transmitting the configuration for the full-duplex communications to the UE based at least in part on the measurement of the self-interference at the UE, the ratio of the self-interference at the UE to a downlink signal strength, or both.

Aspect 12: The method of aspects 9 through 11, wherein the feedback associated with the self-interference at the UE comprises an uplink power configuration at the UE used for transmitting an uplink transmission causing the self-interference on the downlink transmission, an indication that the UE failed to successfully decode the downlink transmission based at least in part on the self-interference, or both, and wherein transmitting the configuration for the full-duplex communications to the UE comprises: transmitting the configuration for the full-duplex communications to the UE based at least in part on the uplink power configuration, the indication that the UE failed to successfully decode the downlink transmission based at least in part on the self-interference, or both.

Aspect 13: The method of aspects 9 through 12, wherein the feedback associated with the self-interference at the UE comprises a recommended beam pair for full-duplex communications, a recommended uplink power configuration for the full-duplex communications, or both, and wherein transmitting the configuration for the full-duplex communications to the UE comprises: transmitting the configuration for the full-duplex communications to the UE based at least in part on the recommended beam pair for the full-duplex communications, the recommended uplink power configuration for the full-duplex communications, or both.

Aspect 14: The method of aspects 9 through 13, wherein the feedback associated with the self-interference at the UE comprises an indication that the UE transmitted a semi-persistent scheduling uplink transmission that overlaps in a time domain with the downlink transmission, and wherein transmitting the configuration for the full-duplex communications to the UE comprises: transmitting the configuration for the full-duplex communications to the UE based at least in part on the indication that the UE transmitted the semi-persistent scheduling uplink transmission that overlaps in the time domain with the downlink transmission.

Aspect 15: The method of aspects 9 through 14, further comprising: transmitting RRC signaling indicating that the UE is to include the feedback associated with the self-interference at the UE in the report when the UE is operating in the full-duplex mode.

Aspect 16: An apparatus for wireless communication comprising at least one means for performing a method of any one of aspects 9 through 15.

Aspect 17: An apparatus for wireless communication comprising a processor and memory coupled to the processor, the processor and memory configured to perform a method of any one of aspects 1 through 8.

Aspect 18: A non-transitory computer-readable medium storing code for wireless communication, the code comprising instructions executable by a processor to perform a method of any one of aspects 1 through 8.

Aspect 19: An apparatus for wireless communication comprising at least one means for performing a method of any one of aspects 9 through 15.

Aspect 20: An apparatus for wireless communication comprising a processor and memory coupled to the processor, the processor and memory configured to perform a method of any one of aspects 9 through 15.

Aspect 21: A non-transitory computer-readable medium storing code for wireless communication, the code comprising instructions executable by a processor to perform a method of any one of aspects 9 through 15.

Aspect 22: A method for wireless communication at a UE operating in a full-duplex mode, comprising: generating feedback associated with self-interference at the UE based at least in part on the UE failing to successfully decode a downlink transmission and the UE operating in the full-duplex mode; generating a report, the report comprising the feedback associated with the self-interference at the UE based at least in part on the UE operating in the full-duplex mode; and transmitting the report with the feedback associated with the self-interference at the UE.

Aspect 23: The method of aspect 22, wherein the report indicates that the UE failed to successfully decode the downlink transmission.

Aspect 24: The method of aspects 22 and 23, wherein generating the feedback associated with the self-interference at the UE comprises: generating the feedback comprising a measurement of the self-interference at the UE, a ratio of the self-interference at the UE to downlink signal strength of the downlink transmission, or both.

Aspect 25: The method of aspects 22 through 24, further comprising: determining that the UE failed to successfully decode the downlink transmission based at least in part on the self-interference caused by an uplink transmission from the UE, wherein generating the feedback associated with the self-interference at the UE comprises: generating the feedback comprising an uplink power configuration at the UE used for transmitting the uplink transmission, an indication that the UE failed to successfully decode the downlink transmission based at least in part on the self-interference, or both.

Aspect 26: The method of aspects 22 through 25, wherein generating the feedback associated with the self-interference at the UE comprises: generating the feedback comprising a recommended beam pair for full-duplex communications with the base station, a recommended uplink power configuration for full-duplex communications with the base station, or both.

Aspect 27: The method of aspects 22 through 26, further comprising: transmitting a semi-persistent scheduling uplink transmission that overlaps in a time domain with the downlink transmission, wherein generating the feedback associated with self-interference at the UE comprises: generating the feedback comprising an indication that the UE transmitted the semi-persistent scheduling uplink transmission that overlaps in the time domain with the downlink transmission.

Aspect 28: The method of aspects 22 through 27, further comprising: receiving a configuration for full-duplex communications between the UE and the base station based at least in part on transmitting the report with the feedback associated with the self-interference at the UE.

Aspect 29: The method of aspects 22 through 28, further comprising: receiving RRC signaling indicating that the UE is to include the feedback associated with the self-interference at the UE in the report when the UE is operating in the full-duplex mode.

Aspect 30: A method for wireless communication at a base station, comprising: transmitting a downlink transmission to a UE; receiving, from the UE, a report comprising feedback associated with self-interference at the UE based at least in part on the UE operating in a full-duplex mode; and transmitting, to the UE, a configuration for full-duplex communications between the UE and the base station based at least in part on the report comprising the feedback associated with the self-interference.

Aspect 31: The method of aspect 30, wherein the report indicates that the UE failed to successfully decode the downlink transmission.

Aspect 32: The method of aspects 30 and 31, wherein the feedback associated with the self-interference at the UE comprises a measurement of the self-interference at the UE, a ratio of the self-interference at the UE to downlink signal strength of the downlink transmission, or both, and wherein transmitting the configuration for the full-duplex communications to the UE comprises: transmitting the configuration for the full-duplex communications to the UE based at least in part on the measurement of the self-interference at the UE, the ratio of the self-interference at the UE to a downlink signal strength, or both.

Aspect 33: The method of aspects 30 through 32, wherein the feedback associated with the self-interference at the UE comprises an uplink power configuration at the UE used for transmitting an uplink transmission causing the self-interference on the downlink transmission, an indication that the UE failed to successfully decode the downlink transmission based at least in part on the self-interference, or both, and wherein transmitting the configuration for the full-duplex communications to the UE comprises: transmitting the configuration for the full-duplex communications to the UE based at least in part on the uplink power configuration, the indication that the UE failed to successfully decode the downlink transmission based at least in part on the self-interference, or both.

Aspect 34: The method of aspects 30 through 33, wherein the feedback associated with the self-interference at the UE comprises a recommended beam pair for full-duplex communications, a recommended uplink power configuration for the full-duplex communications, or both, and wherein transmitting the configuration for the full-duplex communications to the UE comprises: transmitting the configuration for the full-duplex communications to the UE based at least in part on the recommended beam pair for the full-duplex communications, the recommended uplink power configuration for the full-duplex communications, or both.

Aspect 35: The method of aspects 30 through 34, wherein the feedback associated with the self-interference at the UE comprises an indication that the UE transmitted a semi-persistent scheduling uplink transmission that overlaps in a time domain with the downlink transmission, and wherein transmitting the configuration for the full-duplex communications to the UE comprises: transmitting the configuration for the full-duplex communications to the UE based at least in part on the indication that the UE transmitted the semi-persistent scheduling uplink transmission that overlaps in the time domain with the downlink transmission.

Aspect 36: The method of aspects 30 through 35, further comprising: transmitting RRC signaling indicating that the UE is to include the feedback associated with the self-interference at the UE in the report when the UE is operating in the full-duplex mode.

Aspect 37: An apparatus for wireless communication comprising at least one means for performing a method of any one of aspects 22 through 29.

Aspect 38: An apparatus for wireless communication comprising a processor and memory coupled to the processor, the processor and memory configured to perform a method of any one of aspects 22 through 29.

Aspect 39: A non-transitory computer-readable medium storing code for wireless communication, the code comprising instructions executable by a processor to perform a method of any one of aspects 22 through 29.

Aspect 40: An apparatus for wireless communication comprising at least one means for performing a method of any one of aspects 30 through 36.

Aspect 41: An apparatus for wireless communication comprising a processor and memory coupled to the processor, the processor and memory configured to perform a method of any one of aspects 30 through 36.

Aspect 42: A non-transitory computer-readable medium storing code for wireless communication, the code comprising instructions executable by a processor to perform a method of any one of aspects 30 through 36.

Aspect 43: A method for wireless communication at a UE operating in a full-duplex mode, comprising: identifying that the UE failed to successfully decode a downlink transmission from a base station; generating feedback associated with self-interference at the UE based at least in part on the identifying and the UE operating in the full-duplex mode; generating a report indicating that the UE failed to successfully decode the downlink transmission, the report comprising the feedback associated with self-interference at the UE based at least in part on the UE operating in the full-duplex mode; and transmitting the report with the feedback associated with self-interference at the UE to the base station.

Aspect 44: The method of aspect 43, wherein generating feedback associated with self-interference at the UE comprises: generating feedback comprising a measurement of self-interference at the UE, a ratio of self-interference at the UE to downlink signal strength of the downlink transmission, or both.

Aspect 45: The method of aspects 43 and 44, further comprising: determining that the UE failed to successfully decode the downlink transmission based at least in part on self-interference caused by an uplink transmission from the UE, wherein generating feedback associated with self-interference at the UE comprises: generating feedback comprising an uplink power configuration at the UE used for transmitting the uplink transmission, an indication that the UE failed to successfully decode the downlink transmission based at least in part on the self-interference, or both.

Aspect 46: The method of aspects 43 through 45, wherein generating feedback associated with self-interference at the UE comprises: generating feedback comprising a recommended beam pair for full-duplex communications with the base station, a recommended uplink power configuration for full-duplex communications with the base station, or both.

Aspect 47: The method of aspects 43 through 46, further comprising: transmitting a semi-persistent scheduling uplink transmission that overlaps in a time domain with the downlink transmission, wherein generating feedback associated with self-interference at the UE comprises: generating feedback comprising an indication that the UE transmitted the semi-persistent scheduling uplink transmission that overlaps in the time domain with the downlink transmission.

Aspect 48: The method of aspects 43 through 47, further comprising: receiving a configuration for full-duplex communications between the UE and the base station based at least in part on transmitting the report with the feedback associated with self-interference at the UE to the base station.

Aspect 49: The method of aspects 43 through 48, wherein transmitting the report with the feedback associated with self-interference at the UE to the base station comprises: transmitting the report with the feedback associated with self-interference at the UE to the base station in a control channel, data channel, or both.

Aspect 50: The method of aspects 43 through 49, wherein transmitting the report in the control channel, data channel, or both comprises: transmitting a first stage of the report to the base station in the control channel; receiving a grant allocating resources in the data channel for the UE to transmit a second stage of the report; and transmitting the second stage of the report in the data channel based at least in part on receiving the grant, wherein the second stage of the report comprises the feedback associated with self-interference at the UE.

Aspect 51: The method of aspects 43 through 50, further comprising: receiving RRC signaling indicating that the UE is to include the feedback associated with self-interference at the UE in the report when the UE is operating in the full-duplex mode.

Aspect 52: A method for wireless communication at a base station, comprising: transmitting a downlink transmission to a UE; receiving a report from the UE indicating that the UE failed to successfully decode the downlink transmission, wherein the report comprises feedback associated with self-interference at the UE based at least in part on the UE operating in a full-duplex mode; and transmitting, to the UE, a configuration for full-duplex communications between the UE and the base station based at least in part on receiving the report with the feedback associated with self-interference.

Aspect 53: The method of aspect 52, wherein the feedback associated with self-interference at the UE comprises a measurement of self-interference at the UE, a ratio of self-interference at the UE to downlink signal strength of the downlink transmission, or both, and wherein transmitting the configuration for the full-duplex communications to the UE comprises: transmitting the configuration for the full-duplex communications to the UE based at least in part on the measurement of self-interference at the UE, the ratio of self-interference at the UE to downlink signal strength, or both.

Aspect 54: The method of aspects 52 and 53, wherein the feedback associated with self-interference at the UE comprises an uplink power configuration at the UE used for transmitting an uplink transmission causing self-interference on the downlink transmission, an indication that the UE failed to successfully decode the downlink transmission based at least in part on self-interference, or both, and wherein transmitting the configuration for the full-duplex communications to the UE comprises: transmitting the configuration for the full-duplex communications to the UE based at least in part on the uplink power configuration, the indication that the UE failed to successfully decode the downlink transmission based at least in part on self-interference, or both.

Aspect 55: The method of aspects 52 through 54, wherein the feedback associated with self-interference at the UE comprises a recommended beam pair for full-duplex communications, a recommended uplink power configuration for full-duplex communications, or both, and wherein transmitting the configuration for the full-duplex communications to the UE comprises: transmitting the configuration for the full-duplex communications to the UE based at least in part on the recommended beam pair for full-duplex communications, the recommended uplink power configuration for full-duplex communications, or both.

Aspect 56: The method of aspects 52 through 55, wherein the feedback associated with self-interference at the UE comprises an indication that the UE transmitted a semi-persistent scheduling uplink transmission that overlaps in a time domain with the downlink transmission, and wherein transmitting the configuration for the full-duplex communications to the UE comprises: transmitting the configuration for the full-duplex communications to the UE based at least in part on the indication that the UE transmitted the semi-persistent scheduling uplink transmission that overlaps in the time domain with the downlink transmission.

Aspect 57: The method of aspects 52 through 56, wherein receiving the report with the feedback associated with self-interference at the UE comprises: receiving the report with the feedback associated with self-interference at the UE from the UE in a control channel, data channel, or both.

Aspect 58: The method of aspects 52 through 57, wherein receiving the report in the control channel, data channel, or both comprises: receiving a first stage of the report from the UE in the control channel; transmitting a grant allocating resources in the data channel for the UE to transmit a second stage of the report; and receiving the second stage of the report in the data channel based at least in part on transmitting the grant, wherein the second stage of the report comprises the feedback associated with self-interference at the UE.

Aspect 59: The method of aspects 52 through 58, further comprising: transmitting RRC signaling indicating that the UE is to include the feedback associated with self-interference at the UE in the report when the UE is operating in the full-duplex mode.

Aspect 60: An apparatus for wireless communication comprising at least one means for performing a method of any one of aspects 43 through 51.

Aspect 61: An apparatus for wireless communication comprising a processor and memory coupled to the processor, the processor and memory configured to perform a method of any one of aspects 43 through 51.

Aspect 62: A non-transitory computer-readable medium storing code for wireless communication, the code comprising instructions executable by a processor to perform a method of any one of aspects 43 through 51.

Aspect 63: An apparatus for wireless communication comprising at least one means for performing a method of any one of aspects 52 through 59.

Aspect 64: An apparatus for wireless communication comprising a processor and memory coupled to the processor, the processor and memory configured to perform a method of any one of aspects 52 through 59.

Aspect 65: A non-transitory computer-readable medium storing code for wireless communication, the code comprising instructions executable by a processor to perform a method of any one of aspects 52 through 59.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    one or more memories; and
    one or more processors coupled with the one or more memories and configured to cause the UE to:
        receive signaling that indicates a first configuration for full-duplex communications, wherein the first configuration comprises at least an uplink transmit beam, a downlink receive beam, a precoding matrix indicator, a rank indication, or any combination thereof, and wherein the first configuration indicates to report, to a network entity, at least one self-interference information associated with self-interference measured at the UE;
        transmit an uplink transmission in accordance with the first configuration for full-duplex communications, wherein the uplink transmission is based at least in part on semi-persistent scheduling that schedules the uplink transmission to overlap in a time domain with a downlink transmission;
        generate feedback associated with the self-interference measured at the UE based at least in part on a failure of the UE to successfully decode the downlink transmission when in a full-duplex mode and on the first configuration that indicates to report, to the network entity, the at least one self-interference information associated with the self-interference measured at the UE, wherein the feedback associated with the self-interference measured at the UE includes an indication of the self-interference measured at the UE and an indication that the UE transmitted the uplink transmission based at least in part on the semi-persistent scheduling;
        generate a report that comprises the feedback associated with the self-interference measured at the UE based at least in part on the full-duplex mode;
        transmit the report that comprises the feedback associated with the self-interference measured at the UE; and
        receive an updated configuration for full-duplex communications, wherein the updated configuration decreases the self-interference at the UE below a threshold.

2. The apparatus of claim 1, wherein the report indicates that the UE failed to successfully decode the downlink transmission.

3. The apparatus of claim 1, wherein the indication of the self-interference measured at the UE comprises a measurement of the self-interference at the UE, a ratio of the self-interference measured at the UE to a downlink signal strength of the downlink transmission, or both, and wherein the measurement of the self-interference corresponds to an uplink beam and a downlink beam associated with the UE.

4. The apparatus of claim 1, wherein the one or more processors are further configured to cause the UE to:
    determine that the UE failed to successfully decode the downlink transmission based at least in part on the self-interference caused by the uplink transmission from the UE,
    wherein the feedback associated with the self-interference measured at the UE further comprises an uplink power configuration for the uplink transmission, an indication that the UE failed to successfully decode the downlink transmission based at least in part on the self-interference, or both.

5. The apparatus of claim 1, wherein the feedback associated with the self-interference measured at the UE further comprises a recommended beam pair for full-duplex communications with a network device, a recommended uplink power configuration for full-duplex communications with the network device, or both.

6. The apparatus of claim 1, wherein the one or more processors are further configured to cause the UE to:
    receive the updated configuration for full-duplex communications between the UE and a network device based at least in part on the report that comprises the feedback associated with the self-interference measured at the UE.

7. The apparatus of claim 1, further comprising:
    one or more antenna arrays configured to receive radio resource control signaling that indicates for the UE to include the feedback associated with the self-interference measured at the UE in the report when the UE is in the full-duplex mode.

8. A method for wireless communication at a UE, comprising:
    receiving signaling indicating a first configuration for full-duplex communications, wherein the first configuration comprises at least an uplink transmit beam, a downlink receive beam, a precoding matrix indicator, a rank indication, or any combination thereof, and wherein the first configuration indicates to report, to a network entity, at least one self-interference information associated with self-interference measured at the UE;
    transmitting an uplink transmission in accordance with the first configuration for full-duplex communications, wherein the uplink transmission is based at least in part on semi-persistent scheduling that schedules the uplink transmission to overlap in a time domain with a downlink transmission;
    generating feedback associated with the self-interference measured at the UE based at least in part on a failure of the UE to successfully decode the downlink transmission when in a full-duplex mode and on the first configuration that indicates to report, to the network entity, the at least one self-interference information associated with the self-interference measured at the UE, wherein the feedback associated with the self-interference measured at the UE includes an indication of the self-interference measured at the UE and an indication that the UE transmitted the uplink transmission based at least in part on the semi-persistent scheduling;

generating a report that comprises the feedback associated with the self-interference measured at the UE based at least in part on the full-duplex mode;

transmitting the report that comprises the feedback associated with the self-interference measured at the UE; and receiving an updated configuration for full-duplex communications, wherein the updated configuration decreases the self-interference at the UE below a threshold.

9. The method of claim 8, wherein the report indicates that the UE failed to successfully decode the downlink transmission.

10. The method of claim 8, wherein the indication of the self-interference measured at the UE comprises a measurement of the self-interference at the UE, a ratio of the self-interference measured at the UE to a downlink signal strength of the downlink transmission, or both, and wherein the measurement of the self-interference corresponds to an uplink beam and a downlink beam associated with the UE.

11. The method of claim 8, further comprising:
determining that the UE failed to successfully decode the downlink transmission based at least in part on the self-interference caused by the uplink transmission from the UE, wherein the feedback associated with the self-interference measured at the UE further comprises an uplink power configuration for the uplink transmission, an indication that the UE failed to successfully decode the downlink transmission based at least in part on the self-interference, or both.

12. The method of claim 8, wherein the feedback associated with the self-interference measured at the UE further comprises a recommended beam pair for full-duplex communications with a network device, a recommended uplink power configuration for full-duplex communications with the network device, or both.

13. The method of claim 8, further comprising:
receiving the updated configuration for full-duplex communications between the UE and a network device based at least in part on the report that comprises the feedback associated with the self-interference measured at the UE.

14. The method of claim 8, further comprising:
receiving radio resource control signaling that indicates for the UE to include the feedback associated with the self-interference measured at the UE in the report when the UE is in the full-duplex mode.

15. An apparatus for wireless communication at a UE, comprising:
means for receiving signaling indicating a first configuration for full-duplex communications, wherein the first configuration comprises at least an uplink transmit beam, a downlink receive beam, a precoding matrix indicator, a rank indication, or any combination thereof, and wherein the first configuration indicates to report, to a network entity, at least one self-interference information associated with self-interference measured at the UE;

means for transmitting an uplink transmission in accordance with the first configuration for full-duplex communications, wherein the uplink transmission is based at least in part on semi-persistent scheduling that schedules the uplink transmission to overlap in a time domain with a downlink transmission;

means for generating feedback associated with the self-interference measured at the UE based at least in part on a failure of the UE to successfully decode the downlink transmission when in a full-duplex mode and on the first configuration that indicates to report, to the network entity, the at least one self-interference information associated with the self-interference measured at the UE, wherein the feedback associated with the self-interference measured at the UE includes an indication of the self-interference measured at the UE and an indication that the UE transmitted the uplink transmission based at least in part on the semi-persistent scheduling;

means for generating a report that comprises the feedback associated with the self-interference measured at the UE based at least in part on the full-duplex mode;

means for transmitting the report that comprises the feedback associated with the self-interference measured at the UE; and means for receiving an updated configuration for full-duplex communications, wherein the updated configuration decreases the self-interference at the UE below a threshold.

16. The apparatus of claim 15, wherein the indication of the self-interference measured at the UE comprises a measurement of the self-interference at the UE, a ratio of the self-interference measured at the UE to a downlink signal strength of the downlink transmission, or both, and wherein the measurement of the self-interference corresponds to an uplink beam and a downlink beam associated with the UE.

17. The apparatus of claim 15, further comprising:
means for determining that the UE failed to successfully decode the downlink transmission based at least in part on the self-interference caused by the uplink transmission from the UE, wherein the feedback associated with the self-interference measured at the UE further comprises an uplink power configuration for the uplink transmission, an indication that the UE failed to successfully decode the downlink transmission based at least in part on the self-interference, or both.

18. The apparatus of claim 15, wherein the feedback associated with the self-interference measured at the UE further comprises a recommended beam pair for full-duplex communications with a network device, a recommended uplink power configuration for full-duplex communications with the network device, or both.

19. The apparatus of claim 15, further comprising:
means for receiving the updated configuration for full-duplex communications between the UE and a network device based at least in part on the report that comprises the feedback associated with the self-interference measured at the UE.

20. The apparatus of claim 15, further comprising:
means for receiving radio resource control signaling that indicates for the UE to include the feedback associated with the self-interference measured at the UE in the report when the UE is in the full-duplex mode.

21. A non-transitory computer-readable medium storing code for wireless communication at a UE, the code comprising instructions executable by one or more processors to cause the UE to:

receive signaling indicating a first configuration for full-duplex communications, wherein the first configuration comprises at least an uplink transmit beam, a downlink receive beam, a precoding matrix indicator, a rank indication, or any combination thereof, and wherein the first configuration indicates to report, to a network entity, at least one self-interference information associated with self-interference measured at the UE;

transmit an uplink transmission in accordance with the first configuration for full-duplex communications, wherein the uplink transmission is based at least in part on semi-persistent scheduling that schedules the uplink transmission to overlap in a time domain with a downlink transmission;

generate feedback associated with the self-interference measured at the UE based at least in part on a failure of the UE to successfully decode the downlink transmission when in a full-duplex mode and on the first configuration that indicates to report, to the network entity, the at least one self-interference information associated with the self-interference measured at the UE, wherein the feedback associated with the self-interference measured at the UE includes an indication of the self-interference measured at the UE and an indication that the UE transmitted the uplink transmission based at least in part on the semi-persistent scheduling;

generate a report that comprises the feedback associated with the self-interference measured at the UE based at least in part on the full-duplex mode;

transmit the report that comprises the feedback associated with the self-interference measured at the UE; and receive an updated configuration for full-duplex communications, wherein the updated configuration decreases the self-interference at the UE below a threshold.

22. The non-transitory computer-readable medium of claim 21, wherein the indication of the self-interference measured at the UE comprises a measurement of the self-interference at the UE, a ratio of the self-interference measured at the UE to a downlink signal strength of the downlink transmission, or both, and wherein the measurement of the self-interference corresponds to an uplink beam and a downlink beam associated with the UE.

23. The non-transitory computer-readable medium of claim 21, wherein the instructions are further executable by the one or more processors to cause the UE to:

determine that the UE failed to successfully decode the downlink transmission based at least in part on self-interference caused by the uplink transmission from the UE, wherein the feedback associated with the self-interference measured at the UE further comprises an uplink power configuration for transmitting the uplink transmission, an indication that the UE failed to successfully decode the downlink transmission based at least in part on the self-interference, or both.

24. The non-transitory computer-readable medium of claim 21, wherein the feedback associated with the self-interference measured at the UE further comprises a recommended beam pair for full-duplex communications with a network device, a recommended uplink power configuration for full-duplex communications with the network device, or both.

25. The non-transitory computer-readable medium of claim 21, wherein the instructions are further executable by the one or more processors to cause the UE to:

receive the updated configuration for full-duplex communications between the UE and a network device based at least in part on the report that comprises the feedback associated with the self-interference measured at the UE.

26. The non-transitory computer-readable medium of claim 21, wherein the instructions are further executable by the one or more processors to cause the UE to:

receive radio resource control signaling that indicates for the UE to include the feedback associated with the self-interference measured at the UE in the report when the UE is in the full-duplex mode.

* * * * *